US012711307B2

(12) United States Patent
Aguirre et al.

(10) Patent No.: US 12,711,307 B2
(45) Date of Patent: Aug. 18, 2026

(54) DELIVERY OF ELECTRONIC COMMUNICATIONS UTILIZING VALIDATED ELECTRONIC COMMUNICATION TEMPLATES

(71) Applicant: Dell Products L.P., Round Rock, TX (US)

(72) Inventors: Luis Fabio Cruz Aguirre, Canoas (BR); Renata De Paris, Porto Alegre (BR); Ronaldo Radaieski Cunda, Porto Alegre (BR)

(73) Assignee: Dell Products L.P., Round Rock, TX (US)

( * ) Notice: Subject to any disclaimer, the term of this patent is extended or adjusted under 35 U.S.C. 154(b) by 316 days.

(21) Appl. No.: 18/655,433

(22) Filed: May 6, 2024

(65) Prior Publication Data

US 2025/0342310 A1 Nov. 6, 2025

(51) Int. Cl.
*G06F 40/186* (2020.01)
*G06F 40/106* (2020.01)

(52) U.S. Cl.
CPC .......... *G06F 40/186* (2020.01); *G06F 40/106* (2020.01)

(58) Field of Classification Search
CPC ............................ G06F 40/186; G06F 40/106
See application file for complete search history.

(56) References Cited

U.S. PATENT DOCUMENTS

2020/0387665 A1* 12/2020 Brindley ............... G06F 3/1462
2023/0044682 A1* 2/2023 Shang ................... G06F 40/143
2025/0220034 A1* 7/2025 Mirzaei ............... H04L 63/1425

OTHER PUBLICATIONS

Node JS Puppeteer API, "Puppeteer Sharp," https://www.puppeteers, Accessed Feb. 12, 2024, 1 page.
Email on Acid, "Never Send Another Broken Email," https://www.emailonacid.com/, Accessed Apr. 18, 2024, 5 pages.
Browserstack, "App & Browser Testing Made Easy," https://www.browserstack.com/, Accessed Apr. 18, 2024, 9 pages.

(Continued)

*Primary Examiner* — Rinna Yi
(74) *Attorney, Agent, or Firm* — Ryan, Mason & Lewis, LLP

(57) ABSTRACT

An apparatus comprises at least one processing device configured to obtain an electronic communication template, to generate a first data structure characterizing features of a base electronic communication generated utilizing the electronic communication template, and to generate a second data structure characterizing features of preview electronic communications rendered utilizing the electronic communication template for different information technology asset configurations. The at least one processing device is also configured to utilize one or more machine learning models to generate a third data structure characterizing similarity between the features of the base and preview electronic communications based on the first and second data structures, to validate the electronic communication template for use with at least one information technology asset configuration based on the third data structure, and to deliver electronic communications to information technology assets having the at least one information technology asset configuration utilizing the validated electronic communication template.

20 Claims, 18 Drawing Sheets

1100

(56) References Cited

OTHER PUBLICATIONS

Appetize, “Run Native Mobile Apps in Your Browser,” https://appetize.io, Accessed Apr. 18, 2024, 7 pages.
Blue Tree Digital, “Screenfly—The Ultimate Screening Testing Tool,” https://bluetree.ai/screenfly/, Accessed Apr. 18, 2024, 3 pages.
Run That App, “Enjoy Mobile Apps in the Browser,” https://www.runthatapp.com/, Accessed Feb. 12, 2024, 7 pages.
Microsoft Learn, “Xamarian Doumentation,” https://learn.microsoft.com/en-us/xamarin/, Accessed Feb. 12, 2024, 3 pages.
Macstadium, “Mac Cloud Solutions on Apple Hardware,” https://www.macstadium.com/, Accessed Apr. 18, 2024, 3 pages.
Macincloud, “Rent a Mac in the Cloud,” https://www.macincloud.com/, Accessed Feb. 12, 2024, 7 pages.
Email on Acid, “API Documentation,” https://api.emailonacid.com/docs/5/0, Accessed Feb. 12, 2024, 7 pages.
Litmus, “Litmus API Documentation,” https://docs.litmus.com/, Feb. 6, 2024, 2 pages.
F. Morales, “Keras-ocr,” https://keras-ocr.readthedocs.io/en/latest/, Accessed Feb. 12, 2024, 1 page.
Stanford Vision Lab, “ImageNet,” https://www.image-net.org/, Accessed Feb. 12, 2024, 1 page.
Difflib, “Helpers for Computing Deltas,” https://docs.python.org/3/library/difflib.html#sequencematcher-objects, Accessed Feb. 12, 2024, 15 pages.
K. Simonyan et al., “Very Deep Convolutional Networks for Large-Scale Image Recognition,” arXiv:1409.1556v6, Apr. 10, 2015, 14 pages.
“FastAPI,” https://fastapi.tiangolo.com/, Accessed Apr. 18, 2024, 19 pages.
Github, “tesseract-ocr/tesseract,” https://github.com/tesseract-ocr/tesseract, Accessed Apr. 18, 2024, 6 pages.
Opencv, “Open Computer Vision Library,” https://opencv.org/, Accessed Apr. 18, 2024, 9 pages.
“TensorFlow,” https://www.tensorflow.org/, Accessed Apr. 10, 2024, 10 pages.
D. Chicco, “Siamese Neural Networks: An Overview,” Artificial Neural Networks, vol. 2190, Aug. 18, 2020, pp. 73-94.

* cited by examiner

600

SMARTMAIL JOBS DASHBOARD

JOBS | RETRIES | RECURRING JOBS | SERVERS

| ID | CRON | TIME ZONE | JOB | NEXT EXECUTION | LAST EXECUTION | CREATED |
|---|---|---|---|---|---|---|
| GeneratePrimary ImagesJob.Start | *** | UTC | Generate Primary Images | In a few seconds | A minute ago | 2 years ago |
| Generate.Statistics Job.Start | *** | UTC | Generate Statistics | In a few seconds | A minute ago | 2 years ago |
| GeneratePreview Job.Start | *** | UTC | Generate Preview | In a few seconds | A minute ago | 2 years ago |
| Synchronize DevicesJob.Start | *** | UTC | Synchronize Devices | In 10 hours | 14 hours ago | 2 years ago |
| TemplateBackup Job.Start | *** | UTC | Template Backup | In an hour | 2 minutes ago | 2 years ago |
| ... | ... | ... | ... | ... | ... | ... |

<table>
<tr><th></th><th>ResNet 50 Neural Network (Pretrained ImageNet)</th><th>Siamese Neural Network (ResNet50)</th><th>Siamese Neural Network (VGG16)</th></tr>
<tr><td>Accuracy</td><td>50%</td><td>74.85%</td><td>91.90%</td></tr>
<tr><td>F1 Score</td><td>0.66%</td><td>71.12%</td><td>91.67%</td></tr>
<tr><td>Confusion Matrix</td>
<td><table><tr><th></th><th>1</th><th>0</th></tr><tr><td>1</td><td>TP=0</td><td>FN=352</td></tr><tr><td>0</td><td>FP=0</td><td>TN=352</td></tr></table>1=Incorrect<br>0=Correct</td>
<td><table><tr><th></th><th>1</th><th>0</th></tr><tr><td>1</td><td>TP=218</td><td>FN=134</td></tr><tr><td>0</td><td>FP=43</td><td>TN=309</td></tr></table>1=Incorrect<br>0=Correct</td>
<td><table><tr><th></th><th>1</th><th>0</th></tr><tr><td>1</td><td>TP=31</td><td>FN=38</td></tr><tr><td>0</td><td>FP=19</td><td>TN=333</td></tr></table>1=Incorrect<br>0=Correct</td>
</tr>
</table>

FIG. 16

DELIVERY OF ELECTRONIC COMMUNICATIONS UTILIZING VALIDATED ELECTRONIC COMMUNICATION TEMPLATES

BACKGROUND

As the value and use of information continues to increase, individuals and businesses seek additional ways to process and store information. Information processing systems may be used to process, compile, store and communicate various types of information. Because technology and information processing needs and requirements vary between different users or applications, information processing systems may also vary (e.g., in what information is processed, how the information is processed, how much information is processed, stored, or communicated, how quickly and efficiently the information may be processed, stored, or communicated, etc.). Information processing systems may be configured as general purpose, or as special purpose configured for one or more specific users or use cases (e.g., financial transaction processing, airline reservations, enterprise data storage, global communications, etc.). Information processing systems may include a variety of hardware and software components that may be configured to process, store, and communicate information and may include one or more computer systems, data storage systems, and networking systems.

SUMMARY

Illustrative embodiments of the present disclosure provide techniques for delivery of electronic communications utilizing validated electronic communication templates.

In one embodiment, an apparatus comprises at least one processing device comprising a processor coupled to a memory. The at least one processing device is configured to obtain an electronic communication template, to generate a first data structure characterizing one or more features of a base electronic communication generated utilizing the electronic communication template, and to generate a second data structure characterizing one or more features of one or more preview electronic communications rendered utilizing the electronic communication template for one or more information technology asset configurations. The at least one processing device is also configured to utilize one or more machine learning models, which take as input the first and one or more additional data structures, to generate a third data structure characterizing similarity between the one or more features of the base electronic communication generated utilizing the electronic communication template and the one or more features of the one or more preview electronic communications rendered utilizing the electronic communication template for the one or more information technology asset configurations. The at least one processing device is further configured to validate the electronic communication template for use with at least one of the one or more information technology asset configurations based at least in part on the third data structure, and to deliver electronic communications to one or more information technology assets having said at least one of the one or more information technology asset configurations utilizing the validated electronic communication template.

These and other illustrative embodiments include, without limitation, methods, apparatus, networks, systems and processor-readable storage media.

BRIEF DESCRIPTION OF THE DRAWINGS

FIG. 6 shows a visualization of background jobs presented via a dashboard of a web-based interface of an electronic communication template validation tool in an illustrative embodiment.

FIG. 16 shows a table of metrics characterizing performance of different neural network architectures in determining similarity between primary and preview images for electronic communication templates in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
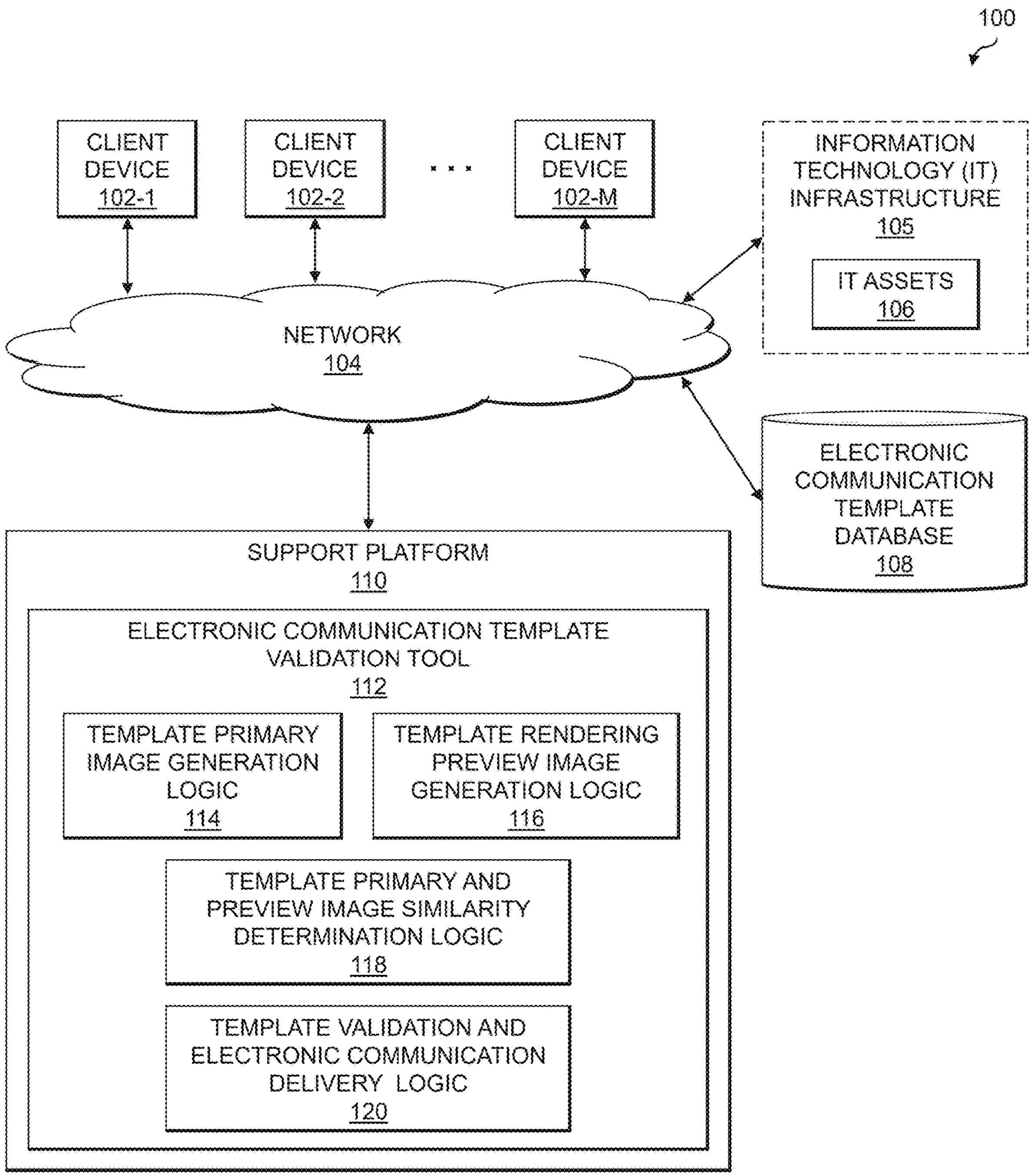
FIG. 1 is a block diagram of an information processing system configured for delivery of electronic communications utilizing validated electronic communication templates in an illustrative embodiment.

FIG. 1 shows an information processing system 100 configured in accordance with an illustrative embodiment. The information processing system 100 is assumed to be built on at least one processing platform and provides functionality for delivery of electronic communications utilizing validated electronic communication templates. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, an electronic communication template database 108, and a support platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the support platform 110 is used for an enterprise system. For example, an enterprise may subscribe to or otherwise utilize the support platform 110 for managing electronic communication delivery, such as delivery of electronic communications (e.g., emails) to various recipients (e.g., users of the client devices 102) utilizing one or more electronic communication templates. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The electronic communication template database 108 is configured to store and record various information that is utilized by the support platform 110. Such information may include, for example, electronic communication templates, primary or original images of the electronic communication templates, preview images for how electronic communication templates are rendered on different device types, electronic communication software, etc. The information may also include machine learning or other artificial intelligence models used for evaluating similarity between original/primary images and preview images for different electronic communication templates. The electronic communication template database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the support platform 110 and other related systems and devices not explicitly shown.

The support platform 110 may be provided as a cloud service that is accessible by one or more of the client devices 102 to allow users thereof to perform validation of electronic communication templates, and for delivery of validated electronic communication templates (e.g., to recipients which may include one or more of the client devices 102, IT assets 106 in the IT infrastructure 105, etc.). In some embodiments, the client devices 102 are assumed to be associated with system administrators, IT managers or other authorized personnel responsible for managing electronic communications for an enterprise, organization or other entity. In some embodiments, the client devices 102 are utilized by members of the same enterprise, organization or other entity that operates the support platform 110. In other embodiments, the client devices 102 are utilized by members of one or more enterprises, organizations or other entities different than the enterprise, organization or other entity that operates the support platform 110 (e.g., a first enterprise provides support functionality for validation and delivery of electronic communications for multiple different customers, businesses, etc.). Various other examples are possible.

In some embodiments, the client devices 102 and/or the IT assets 106 of the IT infrastructure 105 may implement host agents that are configured for automated transmission of information with the electronic communication template database 108 and the support platform 110 regarding electronic communication templates (e.g., that have or will be used for delivery of electronic communications). It should be noted that a "host agent" as this term is generally used herein may comprise an automated entity, such as a software entity running on a processing device. Accordingly, a host agent need not be a human entity.

The support platform 110 in the FIG. 1 embodiment is assumed to be implemented using at least one processing device. Each such processing device generally comprises at least one processor and an associated memory, and implements one or more functional modules or logic for controlling certain features of the support platform 110. In the FIG. 1 embodiment, the support platform 110 implements an electronic communication template validation tool 112. The electronic communication template validation tool 112 comprises template primary image generation logic 114, template rendering preview image generation logic 116, template primary and preview image similarity determination logic 118, and template validation and electronic communication delivery logic 120. The template primary image generation logic 114 is configured to generate an original or primary image of a given electronic communication template. The template rendering preview image generation logic 116 is configured to generate one or more preview images for how the given electronic communication template is or would be rendered on different device types, with different operating systems or software (e.g., web browsers, email clients, etc.), etc. The template primary and preview image similarity determination logic 118 is configured to determine similarity between the primary and preview images, where the similarity may be based at least in part on similarity between the images and text that is recognized within the images utilizing one or more machine learning models. The template validation and electronic communication delivery logic 120 is configured to validate the given electronic communication template (e.g., based on the determined similarity between the primary and preview images of the given electronic communication template), and to deliver electronic communications generated utilizing the given electronic communication template in response to validation of the given electronic communication template.

At least portions of the electronic communication template validation tool 112, the template primary image generation logic 114, the template rendering preview image generation logic 116, the template primary and preview image similarity determination logic 118, and the template validation and the electronic communication delivery logic 120 may be implemented at least in part in the form of software that is stored in memory and executed by a processor.

It is to be appreciated that the particular arrangement of the client devices 102, the IT infrastructure 105, the electronic communication template database 108 and the support platform 110 illustrated in the FIG. 1 embodiment is presented by way of example only, and alternative arrangements can be used in other embodiments. As discussed above, for example, the support platform 110 (or portions of components thereof, such as one or more of the electronic communication template validation tool 112, the template primary image generation logic 114, the template rendering preview image generation logic 116, the template primary and preview image similarity determination logic 118, and the template validation and the electronic communication delivery logic 120) may in some embodiments be implemented internal to the IT infrastructure 105.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the electronic communication template database 108 and the support platform 110 or components thereof (e.g., the electronic communication template validation tool 112, the template primary image generation logic 114, the template rendering preview image generation logic 116, the template primary and preview image similarity determination logic 118, and the template validation and the electronic communication delivery logic 120) may be implemented on respective distinct processing platforms, although numerous other arrangements are possible. For example, in some embodiments at least portions of the support platform 110 and one or more of the client devices 102, the IT infrastructure 105, the IT assets 106 and/or the electronic communication template database 108 are implemented on the same processing platform. A given client device (e.g., 102-1) can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the electronic communication template database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 17 and 18.

It is to be understood that the particular set of elements shown in FIG. 1 for delivery of electronic communications utilizing validated electronic communication templates is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for delivery of electronic communications utilizing validated electronic communication templates will now be described in more detail with reference to the flow diagram of FIG. 2. It is to be understood that this particular process is only an example, and that additional or alternative processes for delivery of electronic communications utilizing validated electronic communication templates may be used in other embodiments.

In this embodiment, the process includes steps 200 through 210. These steps are assumed to be performed by the support platform 110 utilizing the electronic communication template validation tool 112, the template primary image generation logic 114, the template rendering preview image generation logic 116, the template primary and preview image similarity determination logic 118, and the template validation and the electronic communication delivery logic 120. The process begins with step 200, obtaining an electronic communication template (e.g., an email template).

In step 202, a first data structure is generated, the first data structure characterizing one or more features of a base electronic communication generated utilizing the electronic communication template.

In step 204, a second data structure is generated, the second data structure characterizing one or more features of one or more preview electronic communications rendered utilizing the electronic communication template for one or more information technology asset configurations.

The one or more features of the base electronic communication generated utilizing the electronic communication template and the one or more features of the one or more preview electronic communications rendered utilizing the electronic communication template for the one or more information technology asset configurations may comprise one or more visual features and/or one or more textual features. The one or more visual features may comprise at least one of positions and sizes of visual elements. The one or more textual features may comprise at least one of text font, text size, and locations of text displayed. The one or more textual features of the base electronic communication generated utilizing the electronic communication template and the one or more textual features of the one or more preview electronic communications rendered utilizing the electronic communication template for the one or more information technology asset configurations may be determined by: identifying one or more regions of interest containing text; generating bounding boxes for each word recognized in the identified one or more regions of interest containing text; and merging the bounding boxes for each word to generate one or more additional bounding boxes for sentences in the identified one or more regions of interest containing text.

In step 206, one or more machine learning models which take as input the first and one or more additional data structures is utilized to generate a third data structure. The third data structure characterizes similarity between the one or more features of the base electronic communication generated utilizing the electronic communication template and the one or more features of the one or more preview electronic communications rendered utilizing the electronic communication template for the one or more IT asset configurations.

The one or more machine learning models may comprise a first machine learning model configured for determining similarity between one or more visual features of the base electronic communication generated utilizing the electronic communication template and one or more visual features of the one or more preview electronic communications rendered utilizing the electronic communication template for the one or more information technology asset configurations, and a second machine learning model configured for determining similarity between one or more textual features of the base electronic communication generated utilizing the electronic communication template and one or more textual features of the one or more preview electronic communications rendered utilizing the electronic communication template for the one or more information technology asset configurations.

The one or more machine learning models may comprise a Siamese Neural Network (SNN) model. The SNN model may utilize a triplet loss function with a pre-trained Convolutional Neural Network (CNN) subnetwork and transfer learning from a subset of neural network layers of the pre-trained CNN subnetwork.

In step 208, the electronic communication template is validated for use with at least one of the one or more IT asset configurations based at least in part on the third data structure.

In step 210, electronic communications are delivered to one or more IT assets having the at least one of the one or more IT asset configurations utilizing the validated electronic communication template. The one or more IT asset configurations may comprise hardware configurations of devices utilized in rendering the one or more preview electronic communications, software configurations of one or more software applications utilized in rendering the one or more preview electronic communications, combinations thereof, etc. The at least one of the one or more IT asset configurations may correspond to at least one of the one or more preview electronic communications having at least a threshold similarity with the base electronic communication generated utilizing the electronic communication template.

It should be noted that the term "data structure" as used herein is intended to be broadly construed. A data structure, such as any single one of or combination of the first, second and/or third data structures referred to above, may provide a portion of a larger data structure, or any one of or combination of the first, second and third data structures may be combinations of multiple smaller data structures. Therefore, the first, second and/or third data structures referred to above may be different parts of a same overall data structure, or one or more of the first, second and third data structures could be made up of multiple smaller data structures. The data structures may include tables, vectors, embeddings, or various other data structures. In some embodiments, the data structures are specifically formatted or generated such that they are suitable for use as at least one of an input to and an output from a machine learning model.

Figure 2:
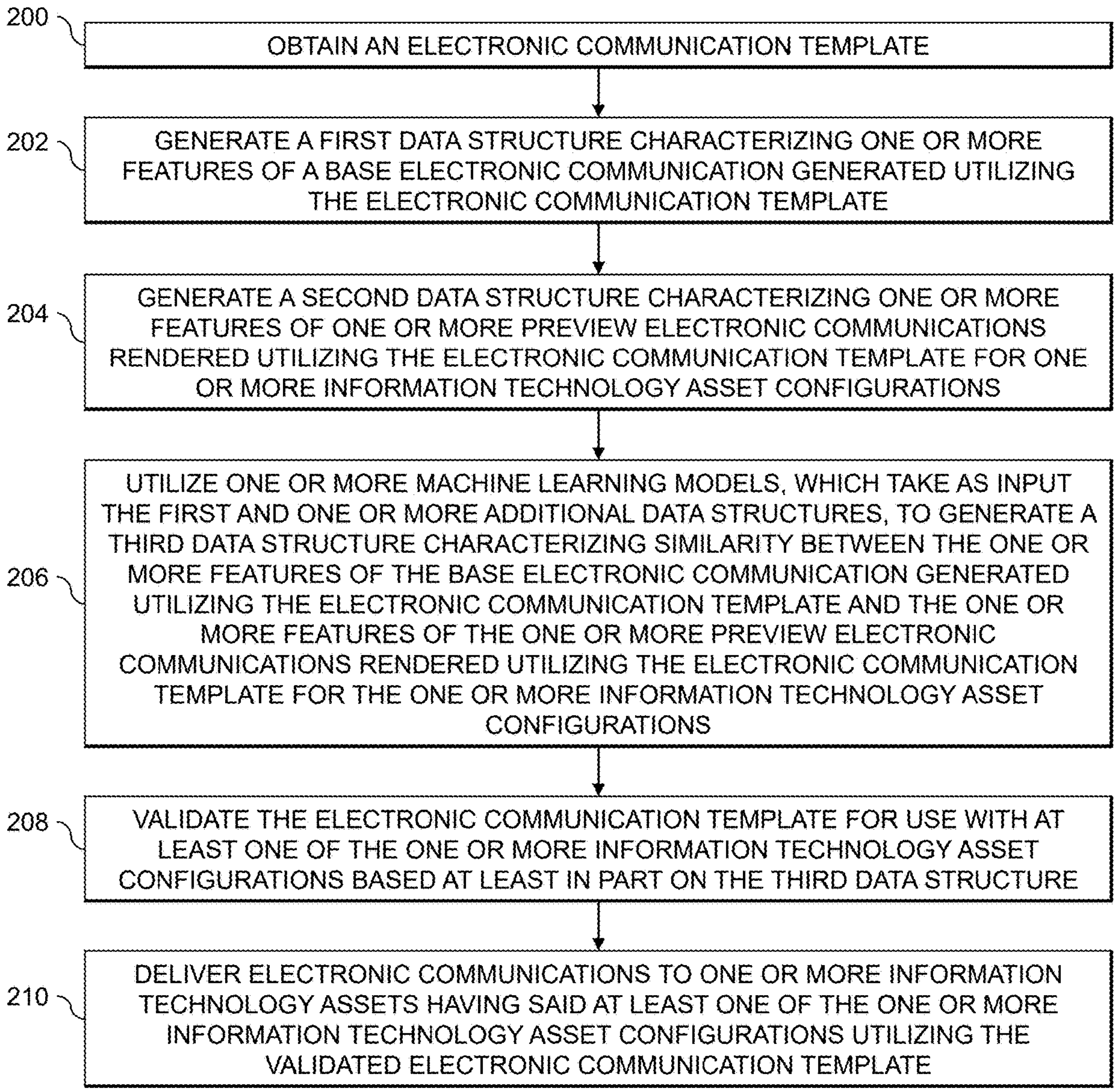
FIG. 2 is a flow diagram of an exemplary process for delivery of electronic communications utilizing validated electronic communication templates in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for validating different electronic communication templates, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Various communication channels may be used by an enterprise, organization or other entity to notify and provide information to its customers or other users. These notifications encompass various types of information campaigns, and may be sent to both internal and external users of an enterprise, organization or other entity, depending on the type of event generated.

Email is one of the most import communication channels available. However, ensuring that email templates (which are an example of what is more generally referred to herein as electronic communication templates) function correctly across the different devices owned by users can be a costly and burdensome effort for enterprises, organization or other entities. This is because there is a wide range of mobile and other device models used, with varying screen sizes and other physical characteristics which may affect the way in which email templates are displayed. Additionally, users may use different browsers, operating systems, email software, etc., which have distinct characteristics and technologies which may affect the way in which email templates is displayed.

Furthermore, in addition to adapting to different client devices, email templates must also accommodate for differences in language and other characteristics. Word length, for example, can vary depending on the language, posing a challenge in adjusting an email template to be flexible across different languages while effectively conveying a message or other content to clients.

Various technical challenges may arise during the validation process of email templates on different devices. For instance, simulators may not provide the same experience as running a client email program on an actual device used by a user. Simulation of rendering on a given device type in a browser may differ from rendering when the client is executed directly on a device of the given device type, resulting in a different layout and potentially breaking or otherwise negatively affecting the appearance and structure of email templates.

Another technical challenge is that there is no way to test the various email clients (e.g., email software, such as Gmail, Outlook, Apple Mail, etc.), since there is no control on the part of the testing team regarding which email client a particular user will choose to use to view particular emails. In this way, it is considered that a message with a broken email template or with an unexpected format that is sent to a user may generate a loss of credibility in the communication channel and in the notification itself, which affects metrics, such as a decrease in click rate. Poorly formatted emails or other electronic communications can lead to several issues, including readability challenges, unprofessional impression, information confusion, misinterpretation of intent, rejection by spam filters, etc.

Readability Challenges: If an email or other electronic communication lacks proper formatting (e.g., disorganized paragraphs, inadequate line spacing, lack of separation between sections, etc.), it can be difficult for the recipient to read and comprehend the content. This can result in misunderstanding or the loss of important information.

Unprofessional Impression: A poorly formatted email or other electronic communication can create a negative impression of the sender. Grammatical errors, inconsistent punctuation, formatting inconsistencies, etc. may lead the recipient to question the sender's credibility and professionalism.

Information Confusion: When essential details such as dates, deadlines, phone numbers, addresses, etc. are not clearly highlighted or organized, recipients may miss crucial information. This can lead to errors, delays, or even the loss of significant business opportunities.

Misinterpretation of Intent: Inadequate email formatting can result in a misinterpretation of a message's intent or tone. For instance, if keywords are not emphasized, or if emphasis is placed incorrectly, the recipient may interpret the message differently from what the sender intended.

Rejection by Spam Filters: Poorly formatted emails or other electronic communications, or those containing incorrect coding, can be flagged as spam by email or other electronic communication filters. This may cause important messages to be directed to a spam folder, or not even reach a recipient's inbox.

To avoid these and other issues, and to ensure effective communication, there is a need to ensure that emails and other electronic communications are carefully formatted, following appropriate communication conventions. To enhance user experience, it is also desired for email or other electronic communication templates to open with proper formatting. This is a technical challenge for various enterprises, organizations or other entities that notify their customers or other users by email or other electronic communication channels. Illustrative embodiments provide technical solutions for an innovative and automated way of testing and verifying electronic communication templates across multiple device and client types. In some embodiments, machine learning techniques are utilized to compare and identify patterns that adapt electronic communication templates to different platforms, and to compute the similarity between electronic communications rendering in different devices/clients against an original version, presenting a promising approach for electronic communication template validation.

By establishing standards through electronic communication template adaptation, machine learning algorithms are leveraged in some embodiments to identify when an electronic communication template does not fit a particular device or client type. Convolutional Neural Network (CNN) algorithms may be used to extract features from images (e.g., using a Siamese model), and to recognize textual content, providing sufficient information for computing the similarity between two images (e.g., an original image of an electronic communication template and a preview image of how the electronic communication template has or will be rendered on a particular device and/or client type). This is extremely useful in validating an electronic communication template's message before it is sent to users, ensuring that the appearance, structure and credibility of the information are not compromised.

The technical solutions described herein provide an approach for testing electronic communication templates across various device and client types (e.g., different software email clients, different mobile or other device types with different screen sizes, display types, etc.), and for identifying bad rendering through machine learning algorithms (e.g., prior to sending a notification to users utilizing an electronic communication template). The technical solutions ensure that the credibility and trustworthiness of the notifications are increased, enhancing the user experience with the received notifications. The technical solutions also enable the identification of suitable email clients or other software, automatic validation of different electronic communication templates, and verification of electronic communication templates across various email clients or other software. The technical solutions provide a novel approach that, in addition to rendering electronic communication templates in different clients, is able to identify when an electronic communication template does not fit a particular device and/or client type utilizing machine learning.

The technical solutions thus provide various technical advantages, including: increasing the credibility and confidence level of notifications which are sent utilizing electronic communication templates; increasing user experience for incoming notifications; identifying suitable email or other electronic communication clients; automatically validating different electronic communication templates; and allowing verification of electronic communication templates in different email or other electronic communication clients. Further, the technical solutions for validating electronic communication templates utilizing machine learning offer several technical benefits, including time savings, improved quality, increased efficiency, consistent communication, and enhanced personalization.

Time Savings: Automating the electronic communication template validation process saves valuable time. Machine learning can quickly analyze electronic communication templates and identify potential issues, such as formatting errors, missing information, incompatibilities, etc., eliminating the need for manual, time-consuming reviews.

Improved Quality: Machine learning can enhance the quality of electronic communication templates. By learning from existing electronic communication template examples and identifying successful patterns, the machine learning algorithms help create more effective electronic communication templates with better clarity, structure, and visual appeal.

Increased Efficiency: Automated validation of electronic communication templates eliminates repetitive manual reviews. This allows marketing and communication teams, for example, to focus on other strategic tasks, resulting in improved operational efficiency and overall productivity.

Consistent Communication: Using machine learning to validate electronic communication templates ensures consistent communication across all channels. This helps strengthen brand identity, ensuring that conveyed messages are uniform and aligned with an enterprise, organization or other entity's values and objectives.

Enhanced Personalization: Machine learning assists enterprises, organizations and other entities in personalizing electronic communication templates based on recipients' preferences and characteristics. By analyzing data and behavioral patterns, the technical solutions described herein are able to recommend personalized elements such as specific offers, product suggestions, or relevant content, resulting in a more engaging and impactful experience for recipients.

The machine learning-based technical solutions for validating electronic communication templates described herein offer enterprises, organizations or other entities the opportunity to save time, improve quality, increase efficiency, maintain consistent communication, and enhance personalization. These benefits can drive the success of information campaigns (e.g., email marketing campaigns), strengthen user relationships, and fuel business growth. The technical solutions described herein harness the power of machine learning to address various technical challenges. In some embodiments, advanced CNN algorithms and data-driven insights are utilized to develop a cutting-edge approach with various technical advantages relative to conventional approaches.

In some embodiments, the technical solutions provide a tool (e.g., electronic communication template validation tool 112) that is configured to validate electronic communication templates (e.g., validation of communication templates via email) utilizing machine learning techniques to perform image classification to identify when an electronic communication template (e.g., an email template) does not fit a particular device or client type. The electronic communication template validation tool is able to generate or select a corrected electronic communication template before messages are sent, helping to increase the credibility with the recipients and the confidence level of the notifications.

Figure 3:
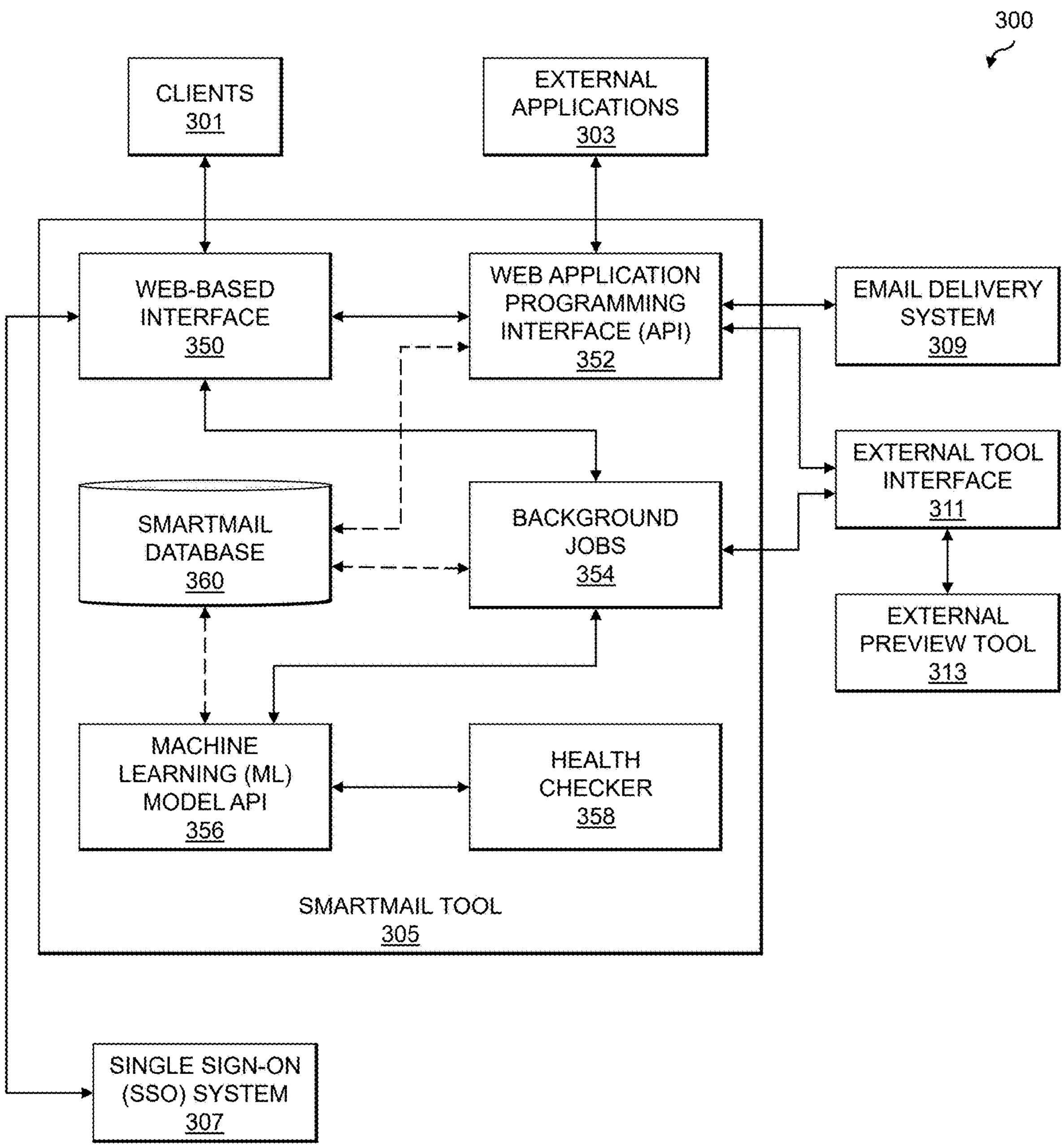
FIG. 3 shows a system configured for validation of electronic communication templates and delivery of electronic communications using validated electronic communication templates in an illustrative embodiment.

FIG. 3 shows a system 300 including clients 301 and external applications 303 which access a SmartMail tool 305 (e.g., an example implementation of the electronic communication template validation tool 112) for performing validation of email templates (e.g., an example of electronic communication templates). The SmartMail tool 305 implements a web-based interface 350 that is accessed by the clients 301, and a web application programming interface (API) 352 that is accessed by the external applications 303 and an email delivery system 309 (e.g., an example of an electronic communication delivery system). An external tool interface 311 facilitates interaction between the SmartMail tool 305 and an external preview tool 313. The web-based interface 350 may comprise a website, a web application, combinations thereof, etc. The web-based interface 350 may interact with the web API 352 for accessing the email delivery system 309 and the external preview tool 313 (e.g., via the external tool interface 311). When the clients 301 access the web-based interface 350, the clients 301 may be redirected to a single sign-on (SSO) system 307 for authentication (e.g., before being given access to restricted features of the SmartMail tool 305). The web-based interface 350 may be updated by one or more background jobs 354 running on the SmartMail tool 305. The background jobs 354 may further integrate with a machine learning (ML) model API 356 of the SmartMail tool 305. A health checker 358 is used for testing health and dependencies of components of the SmartMail tool 305 (e.g., the web-based interface 350, the web API 352, the background jobs 354, the ML model API 356, a SmartMail database 360) and other entities (e.g., the external applications 303, the SSO system 307, the email delivery system 309, the external tool interface 311, the external preview tool 313). The web API 352, the background jobs 354 and the ML model API 356 may update a SmartMail database 360, which maintains various information related to email or other electronic communication templates as described elsewhere herein. The SmartMail tool 305 is configured to validate email or other electronic communication templates.

When one of the clients 301 accesses the web-based interface 350 of the SmartMail tool 305, that client 301 may request validation of a given email template (e.g., for use in delivering emails to different recipients, which may be associated with different device types, email clients, etc.). In response, the web-based interface 350 may access the web API 352 in order to generate preview images for how the given email template will be rendered on different device types, email clients, etc. using the external preview tool 313 (e.g., an Email on Acid tool). Such preview images are returned to the web API 352 and may be updated in the SmartMail database 360. The SmartMail tool 305 can validate the given email template for particular recipients (e.g., associated with different device types and/or email clients). This may involve accessing the ML model API 356, which pulls the preview images maintained in the SmartMail database 360 and utilizes one or more ML algorithms for determining the similarity between the preview images for different device types and/or email clients and an original or primary image of the given email template. If validated by the SmartMail tool 305, the web-based interface 350 may utilize the web API 352 to deliver emails using the given email template via the email delivery system 309 (e.g., a Salesforce Marketing Cloud tool).

Figure 4:
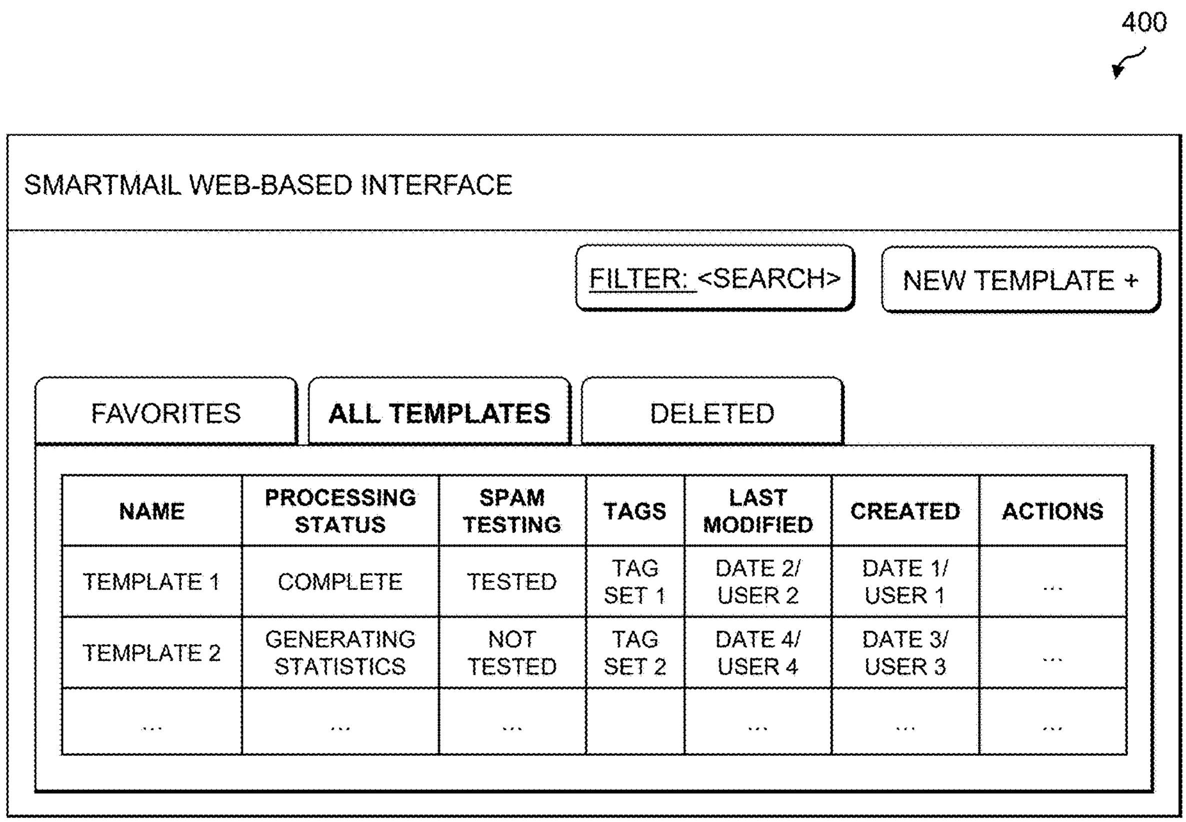
FIG. 4 shows a visualization of electronic communication templates presented via a dashboard of a web-based interface of an electronic communication template validation tool in an illustrative embodiment.

The web-based interface 350 provides a layer of the SmartMail tool 305 that is responsible for managing information in the SmartMail tool 305. The web-based interface 350 is the entry point for the clients 301 and integrates into the web API 352 for managing data in the SmartMail tool 305. The web-based interface 350 provides a number of features, including but not limited to: template management; template preview; uniform resource locator (URL) validation; enabling and disabling devices and email clients; spam testing; user management; similarity range configuration; device image classification; integration of the email delivery system 309; etc. FIG. 4 shows a visualization 400 of a SmartMail web-based interface (e.g., which may be provided as part of the web-based interface 350 of the SmartMail tool 305). The visualization 400 in FIG. 4 shows a dashboard with a selected tab of "all templates" which displays all email templates which have been added to the SmartMail tool 305, with various information relating to the templates including template name, processing status, spam testing, tags, last modification and creation dates and users, actions, etc. The visualization 400 includes interface features for filtering the list of templates, and for adding new templates.

Figure 5:
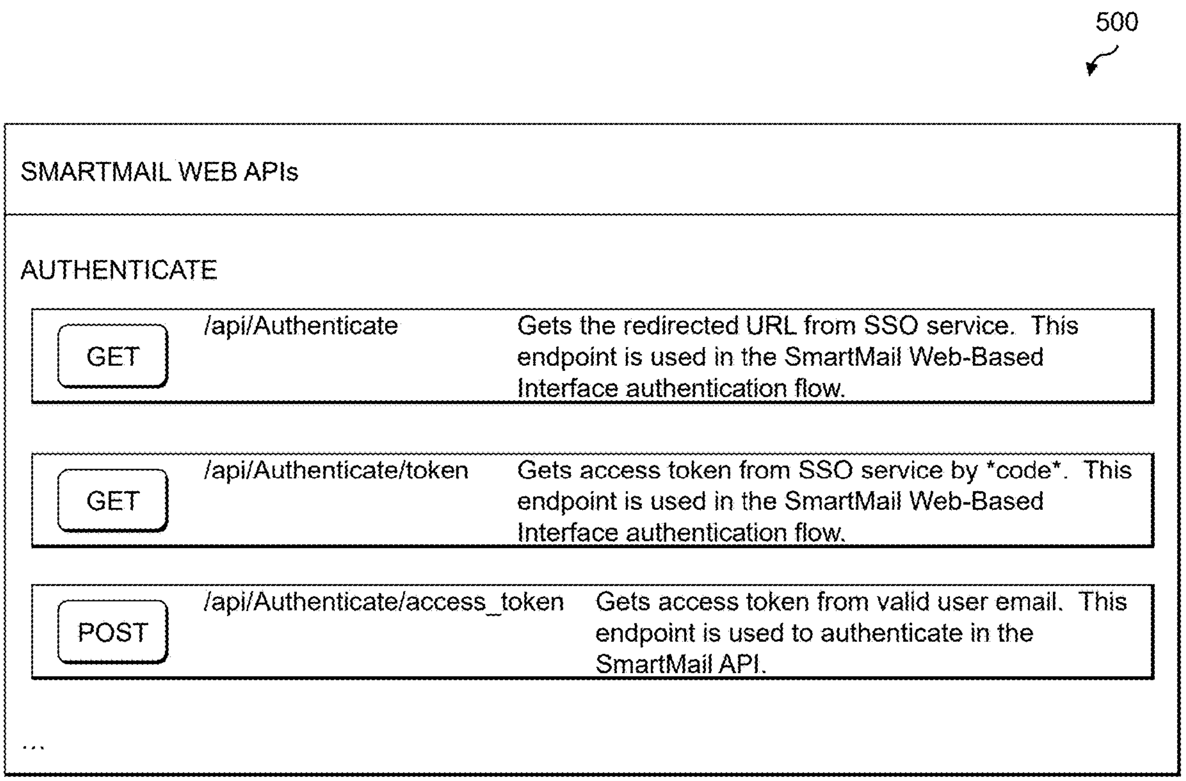
FIG. 5 shows a visualization of web application programming interfaces presented via a dashboard of a web-based interface of an electronic communication template validation tool in an illustrative embodiment.

The web API 352 is responsible for centralizing different rules and policies in the SmartMail tool 305. The web API 352 may be used directly by external applications 303 (e.g., after suitable authentication, such as using the SSO system 307). The web API 352 may contain various endpoints for managing data in the SmartMail tool 305. FIG. 5 shows a visualization 500 of a dashboard for managing different SmartMail web APIs for authentication, including an endpoint type (e.g., get, post, etc.), path and description.

The background jobs 354 may be run periodically for performing different tasks, like image and preview generation, backing up data for ML model training, automatic device import, etc. FIG. 6 shows a visualization 600 of a dashboard for managing different background jobs 354 running on the SmartMail tool 305. The visualization 600 shows a recurring jobs tab highlighted, which lists information related to a set of recurring ones of the background jobs 354 running on the SmartMail tool 305 (including job identifier (ID), Cron job scheduling, time zone, job, next execution time, last execution time, and creation time.

Figure 7:
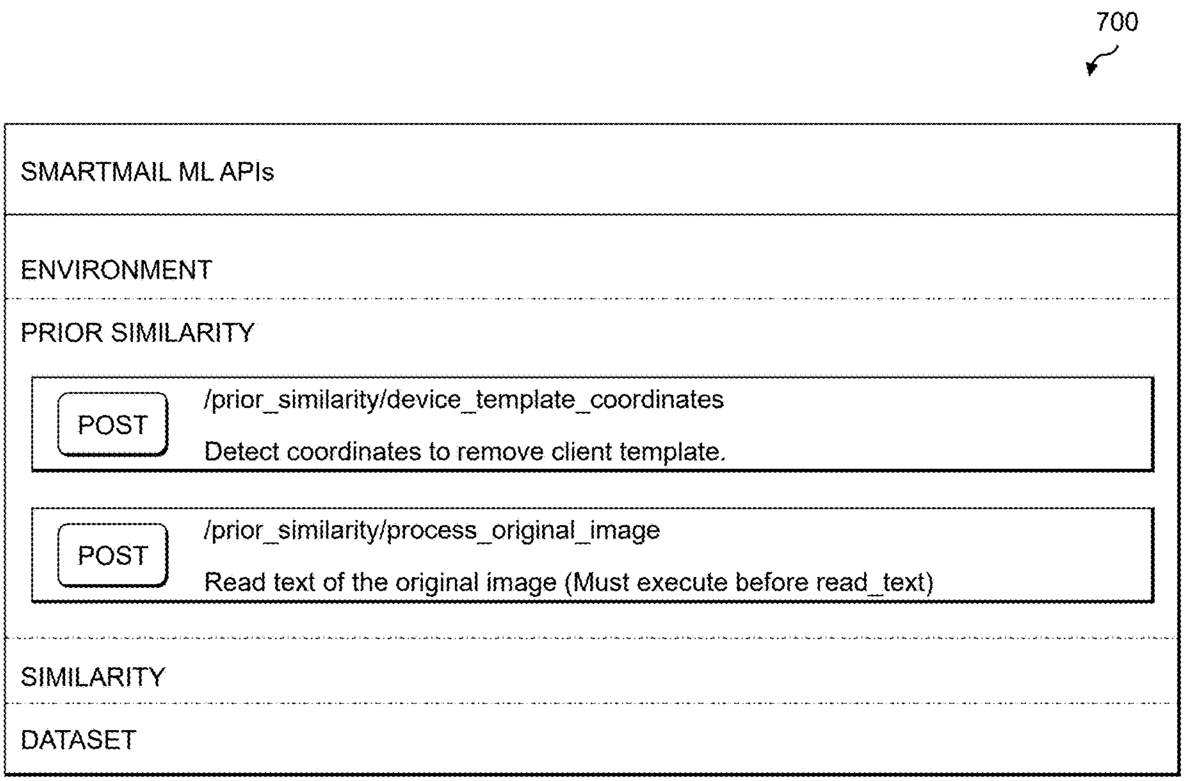
FIG. 7 shows a visualization of machine learning application programming interfaces presented via a dashboard of a web-based interface of an electronic communication template validation tool in an illustrative embodiment.

The ML model API 356 is responsible for providing endpoints for ML operations, such as using images generated for each email template and calculating the similarities (e.g., image similarity, text similarity, etc.) among them. FIG. 7 shows a visualization 700 of a dashboard for managing ML APIs utilized by the SmartMail tool 305, with prior similarity endpoints highlighted, including an endpoint type, path and description.

Figure 8:
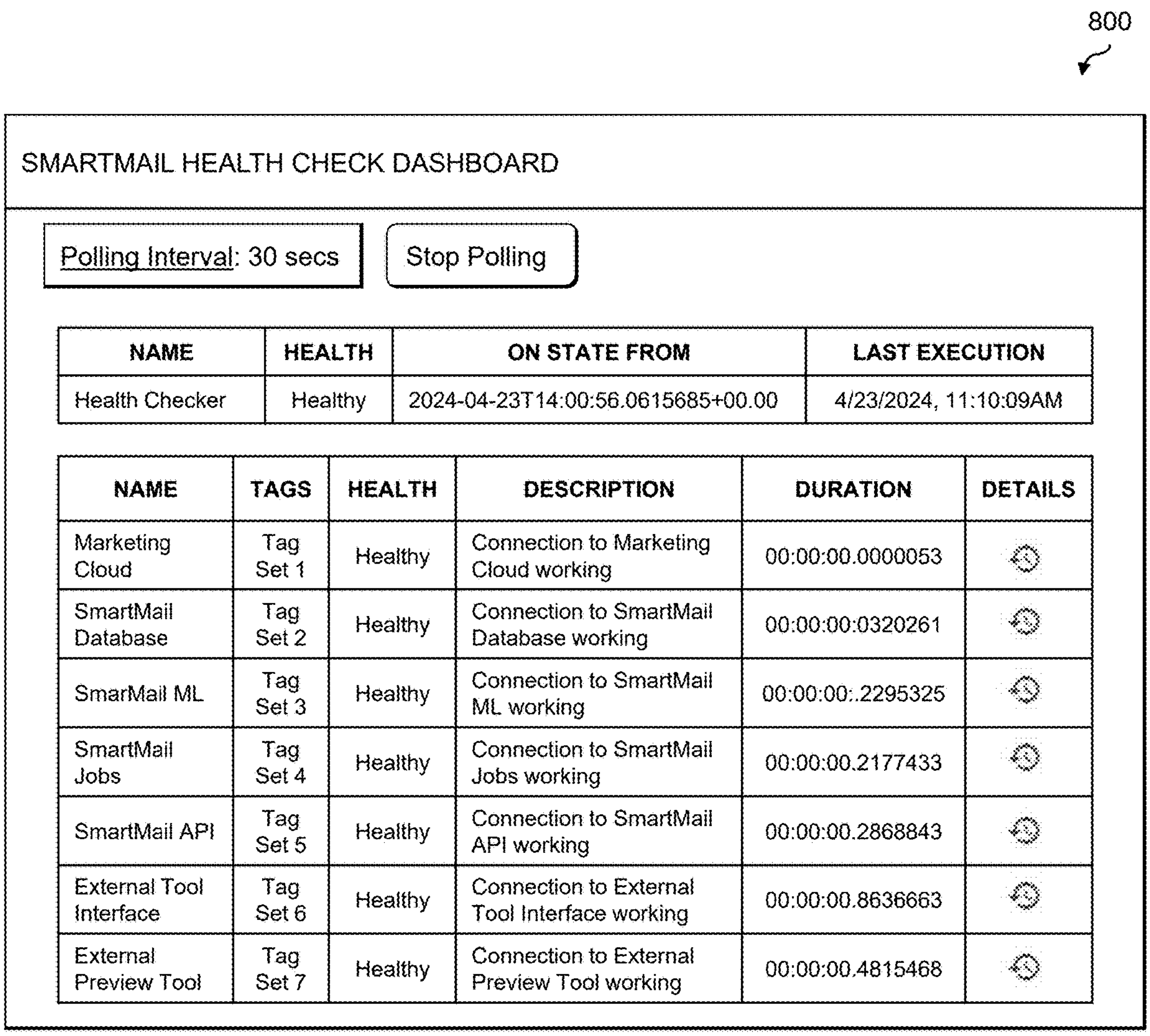
FIG. 8 shows a visualization of health checks presented via a dashboard of a web-based interface of an electronic communication template validation tool in an illustrative embodiment.

The health checker 358 is responsible for checking the health of various components of the SmartMail tool 305 and dependencies therebetween. The health checker 358 also provides one or more APIs for retrieving health data (e.g., in a JavaScript Object Notation (JSON) format). FIG. 8 shows a visualization 800 of a dashboard for managing health checks in the SmartMail tool 305, illustrating health check status for the health checker 358, with user interface features for configuring a polling interval, for stopping polling of a set of health checks, and for displaying status information for health check name, tags, health, description, duration and details.

The SmartMail tool 305 is configured to validate email templates for use with a variety of devices and email clients, and is configured to generate feedback for helping clients 301 to decide whether or not different email templates should or should not be used for sending emails to users (e.g., via the email delivery system 309). An email template validation flow which may be performed using the SmartMail tool 305 will now be described in further detail, including: creation and/or import of email templates; generating a primary or original image of the email templates; generating preview images for how email templates will or would be rendered on different device types and email clients; and determining similarity between the generated primary and preview images.

Figure 9:
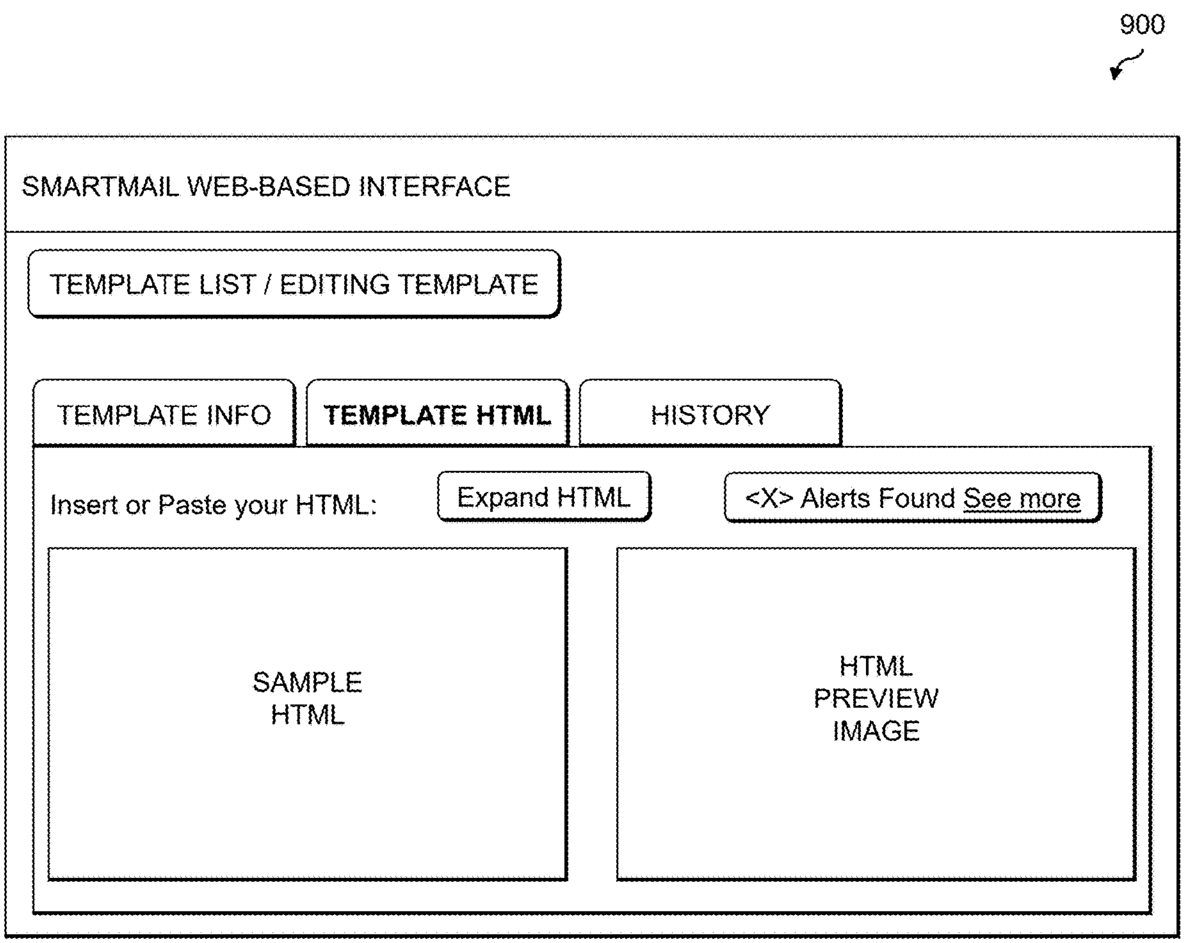
FIG. 9 shows a visualization of electronic communication template editing and preview via a dashboard of a web-based interface of an electronic communication template validation tool in an illustrative embodiment.
Figure 10:
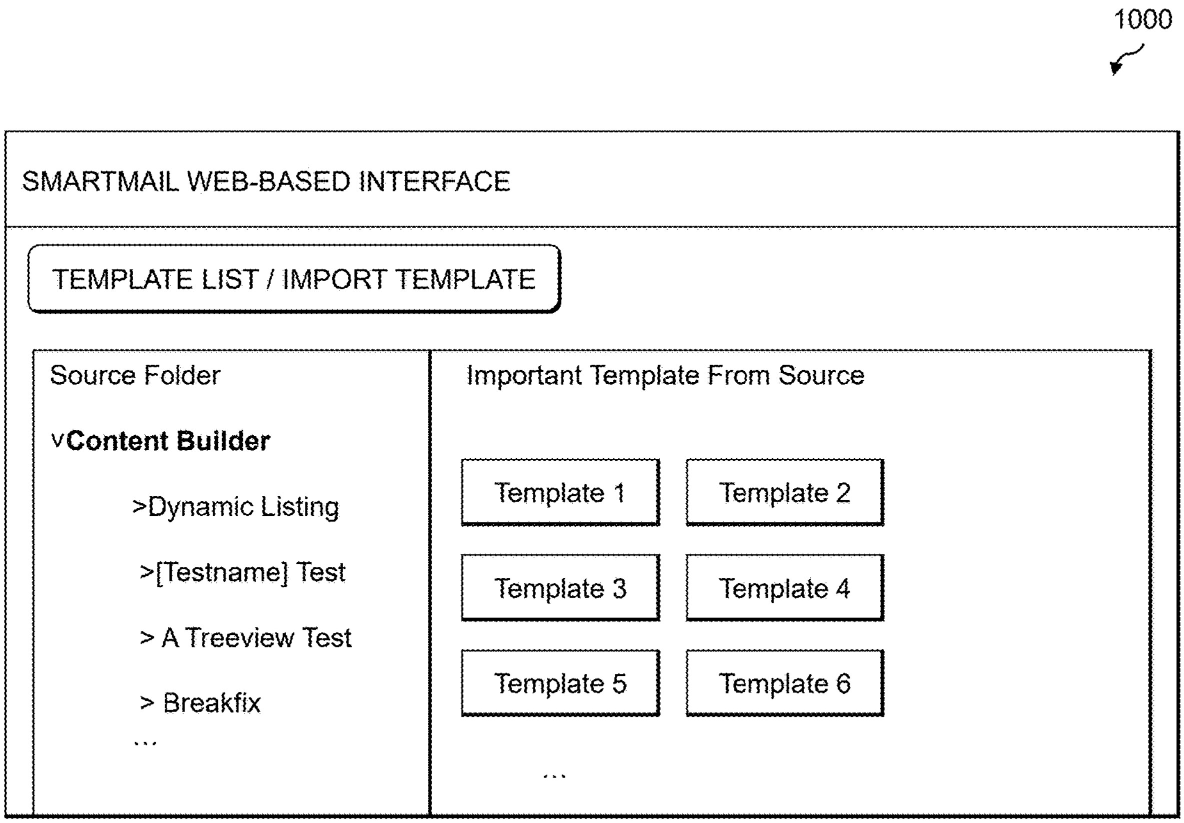
FIG. 10 shows a visualization of electronic communication template importing presented via a dashboard of a web-based interface of an electronic communication template validation tool in an illustrative embodiment.

The clients 301 may utilize the web-based interface 350 of the SmartMail tool 305 to manually create or import email templates (e.g., from the external applications 303, the email delivery system 309, etc.), in order to validate any email template previously created. The email delivery system 309 is used by the SmartMail tool 305 to send emails to users. While an email template is being created, it is possible to have an immediate preview of it. FIG. 9 shows a visualization 900 of a dashboard of the web-based interface 350 of the SmartMail tool 305 configured for creating or editing an email template, with a template HTML tab highlight providing interface features for inserting or pasting HyperText Markup Language (HTML) for an email template, with an HTML preview image being dynamically updated based on entry of sample HTML. The visualization 900 also includes options for viewing template information and history, for detecting and viewing alerts related to the sample HTML, etc. FIG. 10 shows a visualization 1000 of a dashboard of the web-based interface 350 of the SmartMail tool 305 configured for importing email templates from a selected source folder ("Content Builder") with selectable interface features corresponding to different templates contained in the selected source folder.

Figure 11:
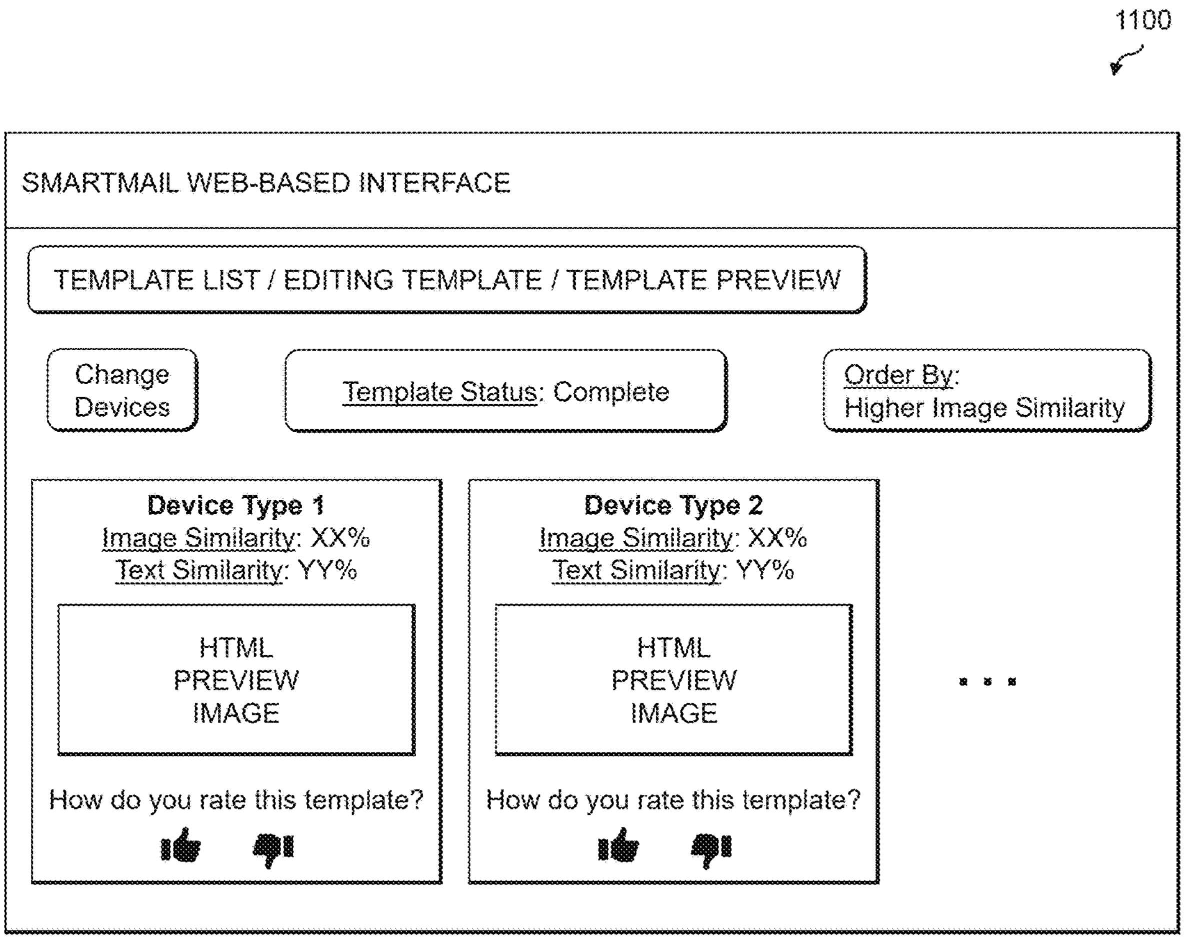
FIG. 11 shows a visualization of rendering previews for electronic communication templates presented via a dashboard of a web-based interface of an electronic communication template validation tool in an illustrative embodiment.

After creating or importing a given email template in the SmartMail tool 305, the next step is to generate a primary or original image of the given email template. The primary or original image of the given email template is a rendering of the given email template (e.g., in a web browser), which will later be used by one or more ML models as a base for similarity calculations. The generation of the primary or original image of the given email template may be performed as one of the background jobs 354 (e.g., using the PuppeteerSharp library). Next, the preview images are generated for the given email template for different device types (e.g., Android, iPhone, iPad, Windows, etc.) and/or email clients (e.g., Gmail, Yahoo, Outlook, etc.). The generation of the preview images may also run as one of the background jobs 354, and may involve sending the given email template (e.g., template HTML) to the external preview tool 313 (e.g., Email on Acid) via the web API 352 and the external tool interface 311 (e.g., a Layer 7 platform). The external preview tool 313 generates screenshots of how the given email template would be rendered on some defined set of device types and email clients (e.g., a default list configured in the SmartMail tool, a customized list specified by the clients 301 via the web-based interface 350 of the SmartMail tool 305, etc.). The SmartMail tool 305 accesses the external preview tool 313 via the external tool interface 311, which provides a platform for securely calling external applications outside an IT infrastructure environment of an enterprise, organization or other entity operating the SmartMail tool 305. Valid account information or other login details may be needed for accessing the external preview tool 313. FIG. 11 shows a visualization 1100 of a dashboard of a web-based interface 350 of the SmartMail tool 305 configured for showing different preview images for different device types for a given email template. For each of the preview images, its associated device type and similarity metrics (e.g., both image similarity and text similarity) are reported, along with user interface features allowing clients 301 to rate how well the email template renders on that device type.

Metrics generation will now be described. Primary and preview images are analyzed to produce decision metrics for end-users (e.g., the clients 301). The SmartMail tool 305 utilizes one or more ML models (e.g., the ML model API 356 and its endpoints called using the background jobs 354) for generating the decision metrics (e.g., similarity statistics between the primary and preview images). In some embodiments, ML models are developed in Python, though this is not a requirement. Various libraries and frameworks may be utilized, including: FastAPI for communicating to the backend using Representational State Transfer (RESTful) APIs in Python; TensorFlow to train and infer deep neural network models; Tesseract Optical Character Recognition (OCR) to extract text from images; and OpenCV to process images and perform computer vision tasks. The detection of problems related to rendering emails using a given email template is based on the similarity percentage between the device/client being tested and a visualization of the HTML considered to be "correct" (e.g., the primary image). The similarity is computed based on the primary and preview images, where the SmartMail tool 305 transforms each HTML file from the given email template into a primary or original email image. The visualization 600 of FIG. 6 illustrates the HTML-to-image transformation in the SmartMail tool 305. The preview images from the email rendering are generated using the external preview tool 313 (e.g., Email on Acid), where the SmartMail tool 305 (e.g., via the external tool interface 311) sends the HTML file of the given email template to the external preview tool 313, which returns preview images for each device/client type that is requested. The visualization 1100 of FIG. 11 shows examples of preview images for different device types.

Figure 12:
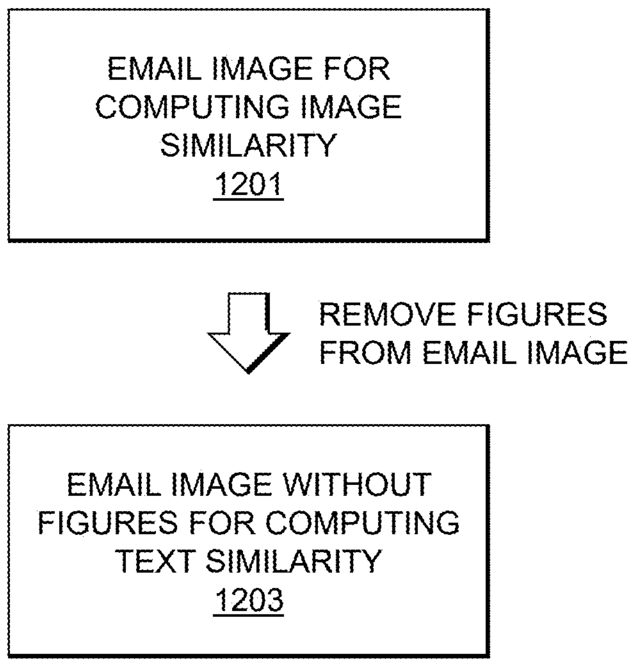
FIG. 12 shows processing of electronic communication images to remove figures therefrom in an illustrative embodiment.

The similarity metrics may be divided into two parts: image similarity and text similarity. FIG. 12 shows an example where an email image 1201 (e.g., a first data structure) for computing image similarity is subject to processing which removes figures from the email image 1201 to produce another email image 1203 (e.g., a second data structure) without figures for computing text similarity. To generate the email image 1203, various tools may be used such as the Keras OCR library. The Keras OCR library provides a polished and packaged version of the Keras Convolutional Recurrent Neural Network (CRNN) and Character Region Awareness for Text Detection (CRAFT) text detection models, and has two pre-trained ML models for: detecting text in images; and extracting text (e.g., using a designated language, such as English). Even though the models are trained using images with only English texts, the detector model is able to recognize works from other languages, such as Korean, Chinese, German, French and Spanish. To generate the email image 1203, the SmartMail tool 305 runs the detector model to generate as output a list of bounding boxes for each word recognized in the email image 1201. The bounding box words are merged to generate a new list of bounding box sentences, aiming to ensure that all textual elements are captured. Next, a blank image is generated with the same size of the email image 1201, and the list of bounding box sentences are added to the blank image to create the email image 1203 with only textual elements (e.g., using the OpenCV library).

Image similarity metrics may include an image similarity percentage, which has the objective of capturing the similarity of image features (e.g., position of elements, size of logos/images, etc.). To compute the image similarity, a screenshot of the full email from a given email template (e.g., a primary or original image) and a screenshot of the preview email containing the email template rendered in a particular device and/or client type (e.g., a preview image) are provided as input to a pre-trained Siamese Neural Network (SNN) or other suitable ML model which finds the similarity of the inputs by comparing their feature vectors. SNN is a neural network architecture that learns a similarity function based on two or more identical subnetworks. The identical subnetworks are neural network architectures that have the same configuration with the same parameters and weights. The subnetwork used to extract the features may be a VGG-16 CNN pretrained on an ImageNet dataset, which is a collection of over 14 million images belonging to 22,000 categories. Further, a transfer learning technique is applied to improve the model performance, where the VGG-16 CNN learns new tasks from a dataset of email images (or other electronic communications) based on the previous knowledge gained from the ImageNet dataset.

Figure 13:
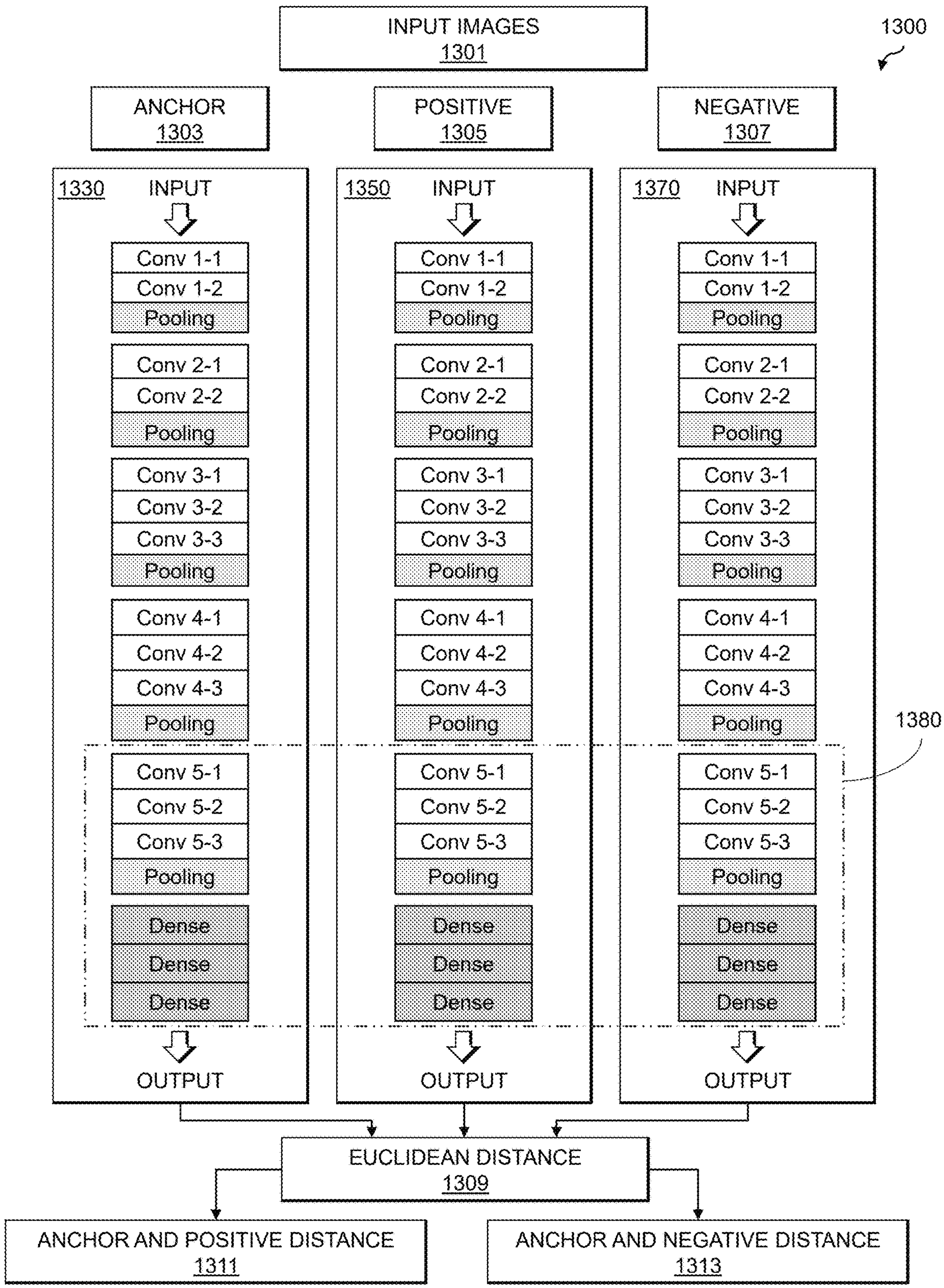
FIG. 13 shows a neural network architecture for training a neural network utilized by an electronic communication template validation tool in an illustrative embodiment.

FIG. 13 shows an SNN architecture 1300 which may be used by the SmartMail tool 305. In the SNN architecture 1300, input images 1301 are applied as anchor object 1303, a positive object 1305 and a negative object 1307 inputs to VGG-16 CNNs 1330, 1350 and 1370, respectively, including sets of convolutional (conv), pooling and dense neural network layers. The box 1380 highlights sets of the neural network layers of the VGG-16 CNNs 1330, 1350 and 1370 which provide unfreezing layers used to transfer the learning based on the email template images. The SNN architecture 1300 uses triplet loss and three branches (for the anchor object 1303, the positive object 1305 and the negative object 1307) pretrained with the ImageNet dataset and transfer learning from email template images. The loss function used to optimize the training and find the best parameters (e.g., weights) in the data was the Triplet Loss. The anchor object 1303 provides a baseline, used as a point of comparison for the two other objects which are original email templates. The positive object 1305 (truth) is known to be similar to the anchor object 1303, which are email previews very similar to the original email template. The negative object 1307 (false) is known to be dissimilar to the anchor object 1303, which are email previews dissimilar to the original email template. Euclidean distance 1309 is calculated for the anchor object 1303, the positive object 1305 and the negative object 1307, which includes an anchor object 1303 and positive object 1305 distance 1311, and an anchor object 1303 and negative object 1307 distance 1313. The distance 1311 is minimized, while the distance 1313 is maximized.

Figure 14:
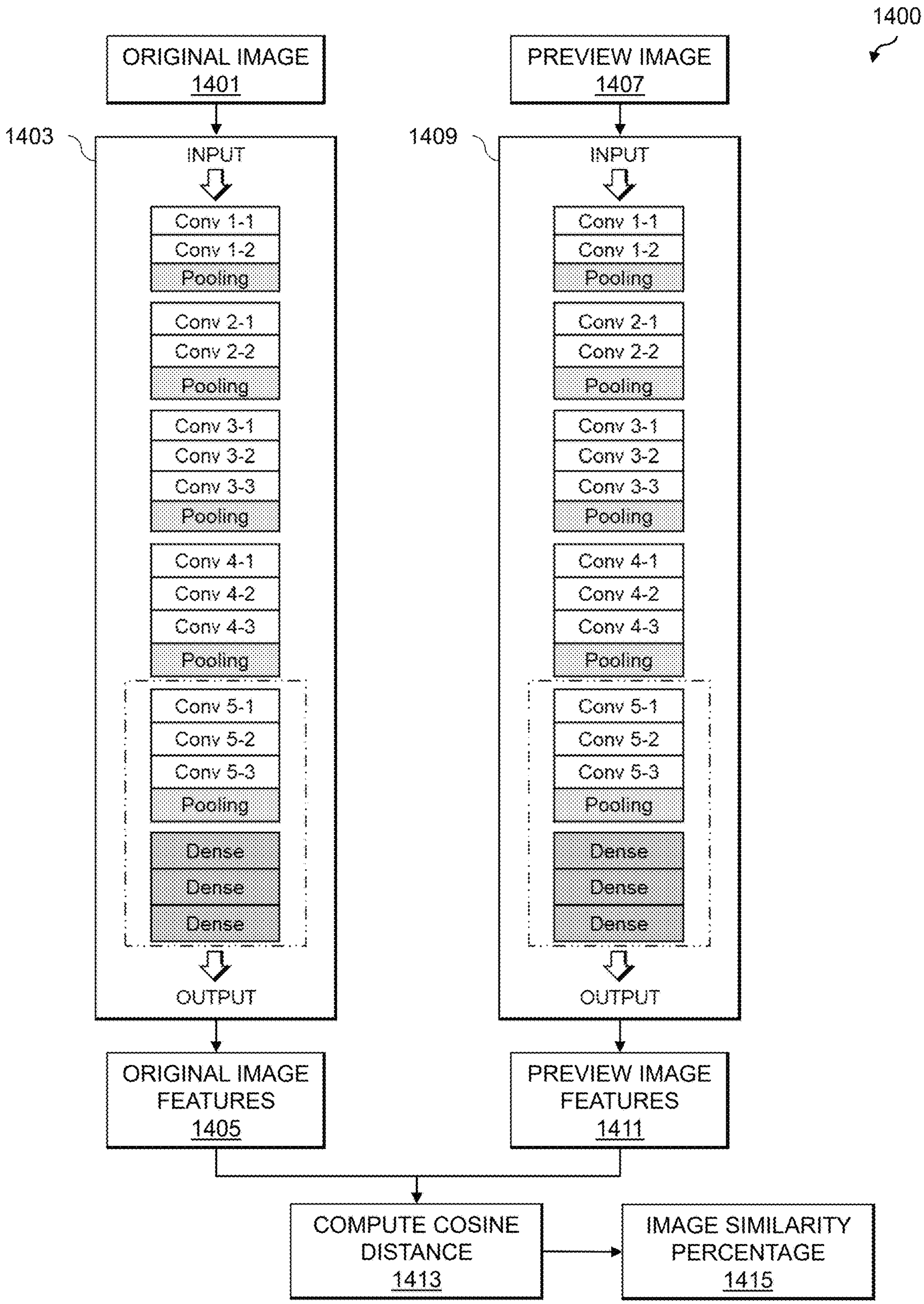
FIG. 14 shows a system flow for determining image similarity between primary and preview images for an electronic communication template in an illustrative embodiment.

FIG. 14 shows a process flow 1400 for utilizing the trained SNN model to compute the similarity between images, where only a sub-network is used to extract the feature vector of each image. In the process flow 1400, the original image 1401 is processed using ML model 1403 (e.g., the trained SNN model) to produce original image features 1405, and a preview image 1407 is processed using ML model 1409 (e.g., the trained SNN model) to produce preview image features 1411. The original image features 1405 and preview image features 1411 are used to compute a cosine distance 1413 therebetween, with an image similarity percentage 1415 between the original image 1401 and the preview image 1407 being based on the computed cosine distance 1413.

Text similarity metrics may include a text similarity percentage, which has the objective of evaluating characteristics of the text. Such characteristics may include: detecting if all the text is on a screen, where a bad rendering can make the email too wide horizontally; determining if the text font is a good size for the reader, where a bad rendering can shrink emails for smaller screens; etc. To compute the text similarity percentage, the screenshots of the emails without images (e.g., email image 1203) are used. The text similarity percentage between an original email template and a preview from an email rendered in a specific device/client type is computed based only on the text elements. Calculating the text similarity percentage may, in some embodiments, include: pre-processing images using the OpenCV library; extracting text using the Tesseract OCR library; and computing the similarity using the Sequence Matcher Python library. The texts from the emails are extracted in blocks, generating a list of Regions of Interest (ROIs), where each ROI contains a set of close words or a sentence, aiming to improve the quality in the read text and capturing the same region when the email has more than one column. This list of ROIs may be generated using functions from OpenCV libraries that first perform a morphology transformation with gradient, after that the element structure is obtained based on a threshold and the text contours are found. Each email image with only textual elements (e.g., email image 1203) has a list of ROIs used as input to the Tesseract OCR library.

Each of the ROIs may be sent to the pytesseract function (e.g., the Tesseract OCR version for Python), to recognize and read the text embedded in images. The parameters to execute pytesseract include: language, page segmentation mode (PSM), and OCR engine mode (OEM), where the last two settings help to improve OCR quality. The SmartMail tool 305 may support various languages, including English, German, French, Korean and Chinese, and allows for setting the PSM and OEM according to the device/client type. The text from each element from the list of ROIs is extracted and concatenated to generate only one string from each email template image. The percentage of similarity between the text read from the primary or original email image and a preview email image is then computed. The metric used to first filter the values is offered by SequenceMatcher from the difflib Python module, which calculates the ratio using the sum of all common subsequent strings in the element name and the text found, and the string length according to:

$$\text{Ratio} = \frac{2.0 \times M}{T}$$

where T is the total number of elements in both sequences, and M is the number of matches. The ratio returns a measure in the range [0,1], being 1.0 if the sequences are identical, and 0.0 if they have nothing in common.

Figure 15:
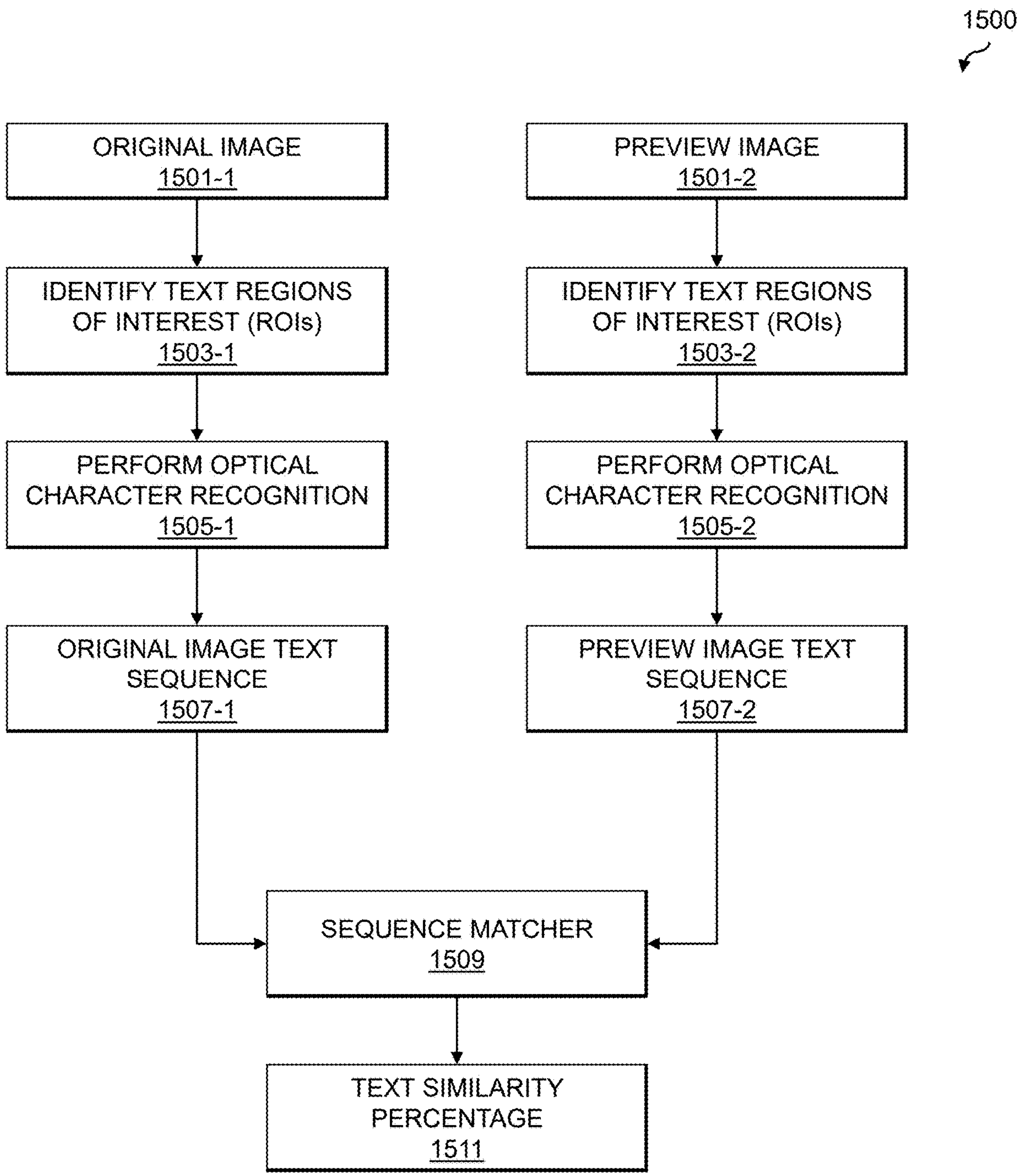
FIG. 15 shows a system flow for determining text similarity between primary and preview images for an electronic communication template in an illustrative embodiment.

FIG. 15 shows a process flow 1500 for determining text similarity. The process flow 1500 begins with obtaining an original or primary image 1501-1 (e.g., of a given email or other electronic communication template) and a preview image 1501-2 (e.g., of the given email or other electronic communication template rendered on a given device and client type). In blocks 1503-1 and 1503-2, text ROIs are identified in the original image 1501-1 and the preview image 1501-2, respectively. In blocks 1505-1 and 1505-2, OCR is performed on the text ROIs identified in the original image 1501-1 and the preview image 1501-2. In blocks 1507-1 and 1507-2, an original image text sequence and a preview image text sequence are produced. In block 1509, sequence matching is performed between the original image text sequence 1507-1 and the preview image text sequence 1507-2. A text similarity percentage 1511 is then calculated based on the sequence matching in block 1509.

Conventional approaches for previewing emails or other electronic communications suffer from various technical challenges, including the need to configure an external access to applications, the need for coding to screenshot full web pages, etc. Further, some conventional approaches are available only for viewport screenshots, or do not provide or permit screenshots at all. It is also difficult to automate scripts (e.g., for entering in specific emails or other electronic communications, for automating screenshotting, etc.) in some conventional approaches. Still further, some conventional approaches do not permit selection of some types of device and/or client characteristics (e.g., operating system), require actual devices with different devices and/or client characteristics to generate preview images, and/or require complicated server management, application development and deployment. Conventional approaches lack the intelligence to identify and compute the differences existing between email or other electronic communication templates and previews thereof utilizing ML techniques.

The SmartMail tool 305 was evaluated utilizing an experimental dataset in order to validate and select optimal artificial intelligence or other ML models for computing similarity. The dataset used for performing transfer learning includes over 2,500 images (e.g., primary/original and preview images). The dataset is prepared using a set of email templates collected from the email delivery system 309. Emails for such templates were rendered using the SmartMail tool 305 for 15 different device and client types, and all images were manually classified into two rendering classes: correct (0) and incorrect (1). The dataset is then separated into training, testing and validation groups. To validate and select a ML model that presents the best performance for computing image similarity, three neural network architectures were used: (1) ResNet50 pretrained with the ImageNet dataset, selected as a baseline; (2) SNN with ResNet50 pretrained with the ImageNet dataset and retrained with transfer learning as the subnetworks; and (3) SNN with VGG-16 pretrained with the ImageNet dataset and retrained with transfer learning as the subnetworks. The last two architectures were retrained using over 1,000 email template images for training, over 300 images for validation, and over 300 images for testing. Further, to meet the triplet loss requirements, the dataset was rearranged as follows: (i) the original or primary email image is set as the anchor object; (ii) preview email images with correct rendering are set as positive objects; and (iii) preview email images with incorrect rendering are set as negative objects. The experiments were performed using batch size equal to 16 and 15 epochs for training.

To generate the results, the quantity of images in the test set ended up having the double of the datapoints selected. This is because each anchor image is compared with a positive and a negative image, having two similarity percentages for each data point. The output of the cosine distance function is a value between 0 and 1. Since all images were manually classified as correct (0) or incorrect (1), a threshold is used to determine a range of similarities that represents each class. For the experiment, the middle of the distribution is used as a threshold (in other words, percentages between 0 and 0.5 are classified as incorrect and values between 0.5 and 1 are classified as correct). This threshold was used to compute the accuracy, F1 score and the confusion matrix for each of the neural network architectures tested as shown in the table 1600 of FIG. 16. As illustrated in the table 1600, the neural network architecture that presented the best results was the SNN with VGG-16 as the subnetwork (e.g., the architecture illustrated in FIG. 13, where the unfreezing layers in box 1380 show were the transfer learning was applied to add specific knowledge of the data with the general knowledge of the ImageNet dataset). The results shown in the table 1600 show the gains being made when the SNN was used, but when the VGG-16 subnetwork is used in the SNN the total gain is even higher, achieving accuracy of 91.90%.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for delivery of electronic communications utilizing validated electronic communication templates will now be described in greater detail with reference to FIGS. 17 and 18. Although described in the context of system 100, these platforms may also be used to implement at least portions of other information processing systems in other embodiments.

Figure 17:
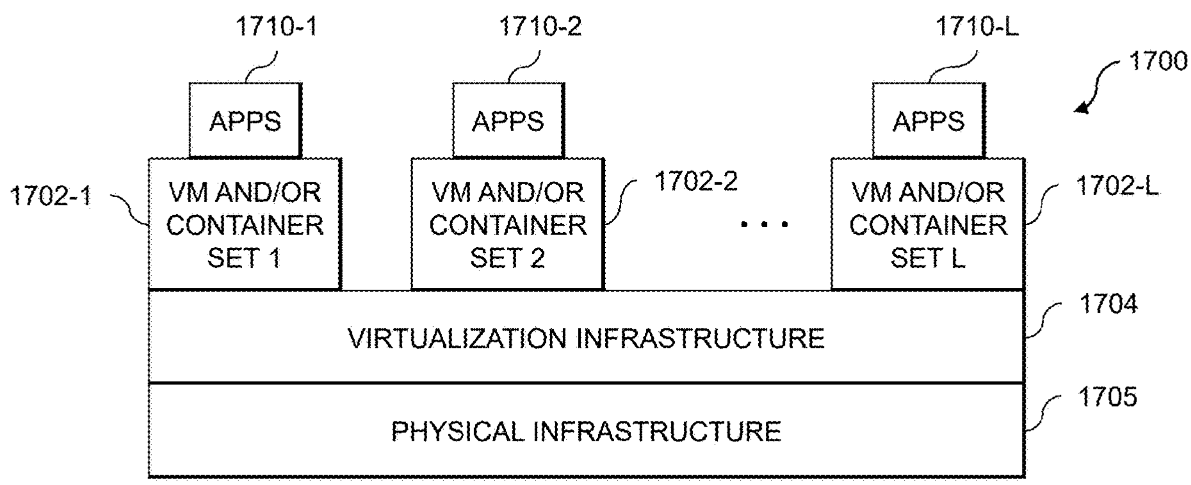
FIGS. 17 and 18 show examples of processing platforms that may be utilized to implement at least a portion of an information processing system in illustrative embodiments.
Figure 18:
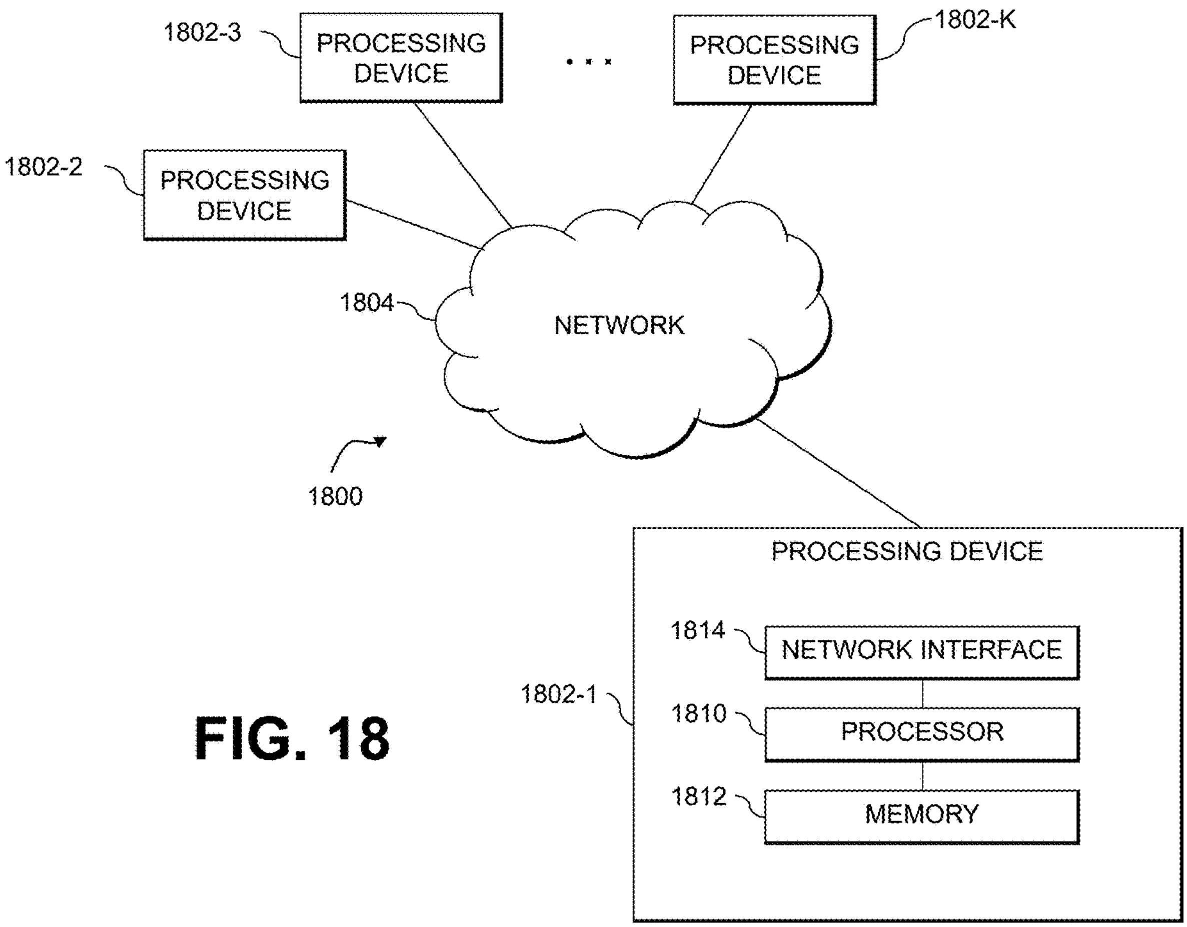

FIG. 17 shows an example processing platform comprising cloud infrastructure 1700. The cloud infrastructure 1700 comprises a combination of physical and virtual processing resources that may be utilized to implement at least a portion of the information processing system 100 in FIG. 1. The cloud infrastructure 1700 comprises multiple virtual machines (VMs) and/or container sets 1702-1, 1702-2, . . . 1702-L implemented using virtualization infrastructure 1704. The virtualization infrastructure 1704 runs on physical infrastructure 1705, and illustratively comprises one or more hypervisors and/or operating system level virtualization infrastructure. The operating system level virtualization infrastructure illustratively comprises kernel control groups of a Linux operating system or other type of operating system.

The cloud infrastructure 1700 further comprises sets of applications 1710-1, 1710-2, . . . 1710-L running on respective ones of the VMs/container sets 1702-1, 1702-2, . . . 1702-L under the control of the virtualization infrastructure 1704. The VMs/container sets 1702 may comprise respective VMs, respective sets of one or more containers, or respective sets of one or more containers running in VMs.

In some implementations of the FIG. 17 embodiment, the VMs/container sets 1702 comprise respective VMs implemented using virtualization infrastructure 1704 that comprises at least one hypervisor. A hypervisor platform may be used to implement a hypervisor within the virtualization infrastructure 1704, where the hypervisor platform has an associated virtual infrastructure management system. The underlying physical machines may comprise one or more distributed processing platforms that include one or more storage systems.

In other implementations of the FIG. 17 embodiment, the VMs/container sets 1702 comprise respective containers implemented using virtualization infrastructure 1704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1700 shown in FIG. 17 may represent at least a portion of one processing platform. Another example of such a processing platform is processing platform 1800 shown in FIG. 18.

The processing platform 1800 in this embodiment comprises a portion of system 100 and includes a plurality of processing devices, denoted 1802-1, 1802-2, 1802-3, . . . 1802-K, which communicate with one another over a network 1804.

The network 1804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1802-1 in the processing platform 1800 comprises a processor 1810 coupled to a memory 1812.

The processor 1810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1812 may comprise random access memory (RAM), read-only memory (ROM), flash memory or other types of memory, in any combination. The memory 1812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term “article of manufacture” as used herein should be understood to exclude transitory, propagating signals. Numerous other types of computer program products comprising processor-readable storage media can be used.

Also included in the processing device 1802-1 is network interface circuitry 1814, which is used to interface the processing device with the network 1804 and other system components, and may comprise conventional transceivers.

The other processing devices 1802 of the processing platform 1800 are assumed to be configured in a manner similar to that shown for processing device 1802-1 in the figure.

Again, the particular processing platform 1800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for delivery of electronic communications utilizing validated electronic communication templates as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to obtain an electronic communication template;

to generate a first data structure characterizing one or more features of a base electronic communication generated utilizing the electronic communication template;

to generate one or more second data structures characterizing one or more features of one or more preview electronic communications rendered utilizing the electronic communication template for one or more information technology asset configurations;

to utilize one or more machine learning models, which take as input the first and the one or more second data structures, to generate a third data structure characterizing similarity between the one or more features of the base electronic communication generated utilizing the electronic communication template and the one or more features of the one or more preview electronic communications rendered utilizing the electronic communication template for the one or more information technology asset configurations;

to validate the electronic communication template for use with at least one of the one or more information technology asset configurations based at least in part on the third data structure; and to deliver electronic communications to one or more information technology assets having said at least one of the one or more information technology asset configurations utilizing the validated electronic communication template.

2. The apparatus of claim 1 wherein the electronic communication template comprises an email template.

3. The apparatus of claim 1 wherein the one or more features of the base electronic communication generated utilizing the electronic communication template and the one or more features of the one or more preview electronic communications rendered utilizing the electronic communication template for the one or more information technology asset configurations comprise one or more visual features.

4. The apparatus of claim 3 wherein the one or more visual features comprise at least one of positions and sizes of visual elements.

5. The apparatus of claim 1 wherein the one or more features of the base electronic communication generated utilizing the electronic communication template and the one or more features of the one or more preview electronic communications rendered utilizing the electronic communication template for the one or more information technology asset configurations comprise one or more textual features.

6. The apparatus of claim 5 wherein the one or more textual features comprise at least one of text font, text size, and locations of text displayed.

7. The apparatus of claim 5 wherein the one or more textual features of the base electronic communication generated utilizing the electronic communication template and the one or more textual features of the one or more preview electronic communications rendered utilizing the electronic communication template for the one or more information technology asset configurations are determined by:

identifying one or more regions of interest containing text;

generating bounding boxes for each word recognized in the identified one or more regions of interest containing text; and merging the bounding boxes for each word to generate one or more additional bounding boxes for sentences in the identified one or more regions of interest containing text.

8. The apparatus of claim 1 wherein the one or more features of the base electronic communication generated utilizing the electronic communication template and the one or more features of the one or more preview electronic communications rendered utilizing the electronic communication template for the one or more information technology asset configurations comprise (i) one or more visual features and (ii) one or more textual features.

9. The apparatus of claim 8 wherein the one or more machine learning models comprises:

a first machine learning model configured for determining similarity between the one or more visual features of the base electronic communication generated utilizing the electronic communication template and the one or more visual features of the one or more preview electronic communications rendered utilizing the electronic communication template for the one or more information technology asset configurations; and a second machine learning model configured for determining similarity between the one or more textual features of the base electronic communication generated utilizing the electronic communication template and the one or more textual features of the one or more preview electronic communications rendered utilizing the electronic communication template for the one or more information technology asset configurations.

10. The apparatus of claim 1 wherein the one or more machine learning models comprises a Siamese Neural Network (SNN) model.

11. The apparatus of claim 10 wherein the SNN model utilizes a triplet loss function with a pre-trained Convolutional Neural Network (CNN) subnetwork and transfer learning from a subset of neural network layers of the pre-trained CNN subnetwork.

12. The apparatus of claim 1 wherein the one or more information technology asset configurations comprise hardware configurations of devices utilized in rendering the one or more preview electronic communications.

13. The apparatus of claim 1 wherein the one or more information technology asset configurations comprise software configurations of one or more software applications utilized in rendering the one or more preview electronic communications.

14. The apparatus of claim 1 wherein said at least one of the one or more information technology asset configurations correspond to at least one of the one or more preview electronic communications having at least a threshold similarity with the base electronic communication generated utilizing the electronic communication template.

15. A computer program product comprising a non-transitory processor-readable storage medium having stored therein program code of one or more software programs, wherein the program code when executed by at least one processing device causes the at least one processing device:

to obtain an electronic communication template;

to generate a first data structure characterizing one or more features of a base electronic communication generated utilizing the electronic communication template;

to generate one or more second data structures characterizing one or more features of one or more preview electronic communications rendered utilizing the electronic communication template for one or more information technology asset configurations;

to utilize one or more machine learning models, which take as input the first and the one or more second data structures, to generate a third data structure characterizing similarity between the one or more features of the base electronic communication generated utilizing the electronic communication template and the one or more features of the one or more preview electronic communications rendered utilizing the electronic communication template for the one or more information technology asset configurations;

to validate the electronic communication template for use with at least one of the one or more information technology asset configurations based at least in part on the third data structure; and to deliver electronic communications to one or more information technology assets having said at least one of the one or more information technology asset configurations utilizing the validated electronic communication template.

16. The computer program product of claim 15 wherein the electronic communication template comprises an email template.

17. The computer program product of claim 15 wherein the one or more features of the base electronic communication generated utilizing the electronic communication template and the one or more features of the one or more preview electronic communications rendered utilizing the electronic communication template for the one or more information technology asset configurations comprise (i) one or more visual features and (ii) one or more textual features.

18. A method comprising:

obtaining an electronic communication template;

generating a first data structure characterizing one or more features of a base electronic communication generated utilizing the electronic communication template;

generating one or more second data structures characterizing one or more features of one or more preview electronic communications rendered utilizing the electronic communication template for one or more information technology asset configurations;

utilizing one or more machine learning models, which take as input the first and the one or more second data structures, to generate a third data structure characterizing similarity between the one or more features of the base electronic communication generated utilizing the electronic communication template and the one or more features of the one or more preview electronic communications rendered utilizing the electronic communication template for the one or more information technology asset configurations;

validating the electronic communication template for use with at least one of the one or more information technology asset configurations based at least in part on the third data structure; and delivering electronic communications to one or more information technology assets having said at least one of the one or more information technology asset configurations utilizing the validated electronic communication template;

wherein the method is performed by at least one processing device comprising a processor coupled to a memory.

19. The method of claim 18 wherein the electronic communication template comprises an email template.

20. The method of claim 18 wherein the one or more features of the base electronic communication generated utilizing the electronic communication template and the one or more features of the one or more preview electronic communications rendered utilizing the electronic communication template for the one or more information technology asset configurations comprise (i) one or more visual features and (ii) one or more textual features.

* * * * *